(12) United States Patent
Rabnawaz et al.

(10) Patent No.: US 11,746,176 B2
(45) Date of Patent: Sep. 5, 2023

(54) OMNIPHOBIC COMPATIBILIZERS FOR CLEAR COATINGS, RELATED ARTICLES, AND RELATED METHODS

(71) Applicant: BOARD OF TRUSTEES OF MICHIGAN STATE UNIVERSITY, East Lansing, MI (US)

(72) Inventors: Muhammad Rabnawaz, East Lansing, MI (US); Muhammad Naveed, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 17/624,652

(22) PCT Filed: Jul. 3, 2020

(86) PCT No.: PCT/US2020/040811
§ 371 (c)(1),
(2) Date: Jan. 4, 2022

(87) PCT Pub. No.: WO2021/007125
PCT Pub. Date: Jan. 14, 2021

(65) Prior Publication Data
US 2022/0259360 A1 Aug. 18, 2022

Related U.S. Application Data

(60) Provisional application No. 62/870,909, filed on Jul. 5, 2019.

(51) Int. Cl.
*C08F 2/50* (2006.01)
*C08F 283/12* (2006.01)
*C09D 5/16* (2006.01)

(52) U.S. Cl.
CPC ............ *C08F 283/124* (2013.01); *C08F 2/50* (2013.01); *C09D 5/1675* (2013.01)

(58) Field of Classification Search
None
See application file for complete search history.

(56) References Cited

U.S. PATENT DOCUMENTS

| 4,511,700 A | 4/1985 | Melby et al. |
| 5,876,802 A | 3/1999 | Brunnemann et al. |
| (Continued) | | |

FOREIGN PATENT DOCUMENTS

| JP | 2004231758 A | * 8/2004 | ............ C08F 246/00 |
| WO | WO-2016/082153 A1 | 6/2016 | |

OTHER PUBLICATIONS

Machine translation of JP-2004231758, translation generated Sep. 2022, 17 pages. (Year: 2022).*

(Continued)

*Primary Examiner* — Robert S Loewe
(74) *Attorney, Agent, or Firm* — Marshall, Gerstein & Borun LLP

(57) ABSTRACT

The disclosure generally relates to omniphobic compatibilizers, which include a polymerization reaction product between a first vinyl monomer, optionally a second vinyl crosslinking monomer, and a functionalized omniphobic polymer. The functionalized omniphobic polymer can include two or more vinyl functional groups or at least one free radical initiator functional group such that the reaction product forming the omniphobic compatibilizer can be a vinyl or free-radical polymerization product. The omniphobic compatibilizer can be incorporated into a UV-curable or a non-UV-curable thermoset omniphobic composition. The UV-curable composition can be a crosslinked polymerization reaction product between the omniphobic compatibilizer, a third vinyl monomer, and a fourth polyvinyl cross- (Continued)

linking monomer. The non-UV-curable composition can be a crosslinked polymerization reaction product between the omniphobic compatibilizer, a first thermosetting component, and a second thermosetting component. The thermoset omniphobic composition can be a coating on a substrate in a corresponding coated article.

35 Claims, 4 Drawing Sheets

(56) References Cited

U.S. PATENT DOCUMENTS

| | | | | |
|---|---|---|---|---|
| 10,364,370 B1* | 7/2019 | Takao | ..................... | C09D 5/165 |
| 2010/0239830 A1* | 9/2010 | Ohnishi | ............... | C09D 11/101 |
| | | | | 526/279 |
| 2012/0108560 A1* | 5/2012 | Evans | ................ | A61K 31/4168 |
| | | | | 524/391 |
| 2012/0237751 A1* | 9/2012 | Kotake | ................... | B32B 15/14 |
| | | | | 428/221 |
| 2012/0247820 A1* | 10/2012 | Miyatake | ................ | C08L 83/06 |
| | | | | 428/458 |
| 2012/0294825 A1* | 11/2012 | Ehara | ................... | C09D 201/10 |
| | | | | 424/78.09 |
| 2013/0237660 A1* | 9/2013 | Iwasaki | ................... | H01L 33/60 |
| | | | | 524/548 |
| 2016/0200937 A1 | 7/2016 | Hu et al. | | |
| 2017/0247572 A1* | 8/2017 | Jaunky | ..................... | C08L 83/10 |
| 2018/0155482 A1* | 6/2018 | Jaunky | ..................... | C08G 77/46 |
| 2018/0244855 A1* | 8/2018 | Jaunky | ................. | C08G 77/442 |
| 2019/0048203 A1* | 2/2019 | Naier | ........................ | C09D 5/00 |
| 2019/0300725 A1* | 10/2019 | Takao | ................... | C09D 5/1675 |
| 2020/0048459 A1 | 2/2020 | Rabnawaz | | |
| 2020/0056055 A1* | 2/2020 | Niimoto | ................ | C09D 183/10 |
| 2020/0347179 A1 | 11/2020 | Rabnawaz | | |
| 2020/0398309 A1 | 12/2020 | Rabnawaz | | |
| 2021/0002410 A1 | 1/2021 | Rabnawaz | | |
| 2021/0040348 A1 | 2/2021 | Rabnawaz | | |
| 2021/0246333 A1 | 8/2021 | Rabnawaz | | |
| 2021/0253901 A1 | 8/2021 | Rabnawaz | | |

OTHER PUBLICATIONS

International Application No. PCT/US2020/040811, International Search Report and Written Opinion, dated Oct. 8, 2020.

* cited by examiner

OMNIPHOBIC COMPATIBILIZERS FOR CLEAR COATINGS, RELATED ARTICLES, AND RELATED METHODS

CROSS REFERENCE TO RELATED APPLICATION

This application is a National Stage application of International Application No. PCT/US20/40811, filed Jul. 3, 2020, which claims priority to U.S. Provisional Patent Application No. 62/870,909 (filed Jul. 5, 2019), the entire disclosures of both of which are incorporated herein by reference.

STATEMENT OF GOVERNMENT INTEREST

None.

BACKGROUND OF THE DISCLOSURE

Field of the Disclosure

The disclosure generally relates to omniphobic compatibilizers, which include a polymerization reaction product between a first vinyl monomer, optionally a second vinyl crosslinking monomer, and a functionalized omniphobic polymer. The functionalized omniphobic polymer can include two or more vinyl functional groups or at least one free radical initiator functional group such that the reaction product forming the omniphobic compatibilizer can be a vinyl or free-radical polymerization product. The omniphobic compatibilizer can be incorporated into a thermoset omniphobic composition, for example UV-curable or a non-UV-curable thermoset composition. The thermoset omniphobic composition can be a coating on a substrate in a corresponding coated article.

Brief Description of Related Technology

When water accumulates on a surface, the surface energy of the material is directly related to how the water will react. Some surfaces may allow the water to spread out into a pool with a large surface area, whereas others may make water bead up into droplets. The contact angle between the water droplet and the surface is used to characterize the surface into three categories: hydrophilic (<90°), hydrophobic (90°-150°), and superhydrophobic (>150°). FIG. 1 is a visual representation of a contact angle measurement.

Hydrophobicity can be achieved in two ways: controlling the chemical interactions between water and the material surface or altering the surface of the material. Generally, non-polar molecular groups are responsible for water beading on a surface as opposed to spreading, due to the lower surface energies exhibited by non-polar groups. A lower surface energy of the material will directly relate to a high contact angle. In contrast, high-energy materials will cause water to spread out in a thin pool, as the polar groups present in surfaces with high energies attract the polar water molecules.

Physically altering the surface (e.g., increasing the roughness thereof) of the material may also increase the hydrophobicity of a material. By creating pillars or other similar features on a textured surface, water interacts with an increased surface area on the material, thus amplifying the chemical interactions between water and the surface. An image depicting how texturing the surface leads to increased contact angle can be seen below in FIG. 2. The use of a rough surface with nano-wells, such as in FIG. 2 prevents water droplets from entering etched grooves. However, under high enough pressure, the water will still disperse into the wells, and such coatings are expensive and difficult to manufacture. Another method (not shown) utilizes a sponge coating that is doped with a hydrophobic material to prevent water dispersion. The sponge method works well at repelling water, but is not a durable material and will eventually degrade. Both of the previous methods generally either lack the feature of optical transparency or require costly additional steps and/or components to provide optical transparency. Optical transparency is key for the coating to allow for coated materials to still be visible.

A material that repels oils is known as oleophobic or lipophobic depending on if the repelling action is a physical or chemical property, respectively, and operates analogously to hydrophobic materials. These materials are often used on touch screen displays so that bodily oils and sweat gland secretions do not build up on the surface of a screen. A material that exhibits both hydrophobic and oleophobic properties is known as omniphobic. Such materials with very high contact angles are often regarded as "self-cleaning" materials, as contaminants will typically bead up and roll off the surface. As such, these materials have possible applications in screen display, window, and building material coatings.

The coating industry highly demands efficient and high-performance polymeric coatings with lower volatile organic compounds (VOC) contents. UV-curable coatings offer a number of potential advantages over conventional evaporation drying techniques, such as instant ambient curing in seconds triggered by UV radiation, lesser equipment space requirements, no heat drying, minimum energy consumption and typically VOC-free environment-friendly method. Advantageously, rapid curing of matrix resin provides a steady procedure with minimized coating shrinkage exhibiting durable high glass quality coats. Being a "green technology", UV curing saves energy and lesser equipment further reduces overall final cost.

Most commercial UV-curable monomers and resins, however, exhibit poor repellent properties towards various polar liquids, non-polar liquids, and solid particles as well. This is due to the presence of polar groups in precursor monomers, e.g., tetrahydrofurfuryl acrylate, isobornyl acrylate, tripropylene glycol diacrylate, etc. Such UV-cured coatings are most susceptible to their surface contamination, which affect greatly to their particular applications. A self-cleaning material should not allow polar and non-polar contaminants to adhere on its surface, and contaminants should be easily wiped from the surface on tilting. High contact angle of a water droplet and lower sliding angle of a surface exhibit better self-cleaning properties. There are two approaches by which a surface can be tailored having high water contact angle and lower sliding angle, i.e., physical and chemical approaches. The physical approach involves increasing the surface roughness by texturing the surface as discussed above in a way that water droplet should have minimum contact with surface, so that it can easily slide on tilting. In this way, textured surface also exhibits higher water contact angle. The chemical approach involves the introduction of chemical moieties into polymeric material that lower its surface tension and show hydrophobic nature. The textured surface approach has its practical limitation to scale up on an industrial scale. In comparison, the chemical approach is facile and can be readily scale up as in terms of processing and fabrication of final material.

Hu et al. U.S. Publication No. 2016/0200937 discloses polyurethane-based and epoxy-based compositions that be used as coatings and adhesives with abrasion-resistant, ink-resistant, anti-graffiti, anti-fingerprint properties. The disclosed process for making the compositions requires graft and block copolymer components along with a two-step/two-pot manufacturing process, increasing the time to manufacture and cost of the product.

SUMMARY

In a first aspect, the disclosure relates to an omniphobic compatibilizer comprising: a polymerization reaction product between: a first vinyl monomer, optionally a second vinyl crosslinking monomer, and a functionalized omniphobic polymer (e.g., polydimethylsiloxane or PDMS) having a glass transition temperature ($T_g$) of 70° C. or less, the functionalized omniphobic polymer comprising two or more vinyl functional groups. The polymerization reaction product and corresponding omniphobic compatibilizer is generally formed via suitable vinyl polymerization conditions, for example in the presence of a suitable free-radical initiator having an azo-linkage (e.g., azobisisobutyonitrile (AIBN)), an inorganic peroxide (e.g., ammonium persulfate), an organic peroxide (e.g., cumene hydroperoxide), or a photoinitiator (e.g., benzophenone). The reaction conditions for the free-radical polymerization are dependent on the nature of the free-radical initiator. In addition to free radical polymerization, controlled radical polymerization (CRP) (e.g., ATRP and modified ATRP systems such as reverse ATRP, NMP, RAFT, temporal CRP) can be used to form the omniphobic compatibilizer, where a free-radical initiator may or may not be required. The omniphobic compatibilizer can also be prepared via a non-free radical mode of polymerization such as anionic, cationic, and coordination polymerization.

In a refinement, the functionalized omniphobic polymer comprises a di-vinyl functionalized omniphobic polymer. The vinyl functional groups can be added to the omniphobic polymer by any suitable method. For example, an omniphobic polymer such as PDMS or otherwise with two terminal amino groups can be reacted with (meth)acrylic acid to provide two corresponding terminal vinyl groups with an amide linkage to the omniphobic polymer. Similarly, PDMS-acrylate or PDMS-methacrylate (e.g., di-(meth)acrylates) can be prepared by PDMS-OH and (meth)acryloyl halide (e.g., Cl, Br). Other methods such as condensation of PDMS-OH and (meth)acrylic acid also can be used. The vinyl groups on the omniphobic polymer may be same (e.g., methacrylate-PDMS-methacrylate) or different (e.g., methacrylate-PDMS-acrylate) in nature.

In a refinement, the polymerization reaction product comprises: block polymerization segments comprising first vinyl monomer backbone units and optionally second vinyl crosslinking monomer units, but no functionalized omniphobic polymer backbone units; and random polymerization segments comprising first vinyl monomer backbone units and optionally second vinyl crosslinking monomer units, and functionalized omniphobic polymer backbone units. Initial polymerization of the first vinyl monomer (optionally in combination with the second vinyl crosslinking monomer) in the absence of the functionalized omniphobic polymer creates block backbone units that do not have any functionalized omniphobic polymer, in which the blocks serve as spacers to keep the functional omniphobic polymer chains sufficiently far apart to avoid tight crosslinking/gelling when the functionalized omniphobic polymer is subsequently added to the polymerization reaction mixture, at which time random copolymerization continues with all of the monomer units. The final copolymer structure includes block segments with (i) first vinyl monomer units, but no functionalized omniphobic polymer units, (ii) first and second vinyl monomer units (e.g., in a random copolymer block), but no functionalized omniphobic polymer units, etc. The final copolymer structure further includes random copolymer segments joining the block segments, where the random copolymer segments include first vinyl monomer units, second vinyl monomer units (when included), and functionalized omniphobic polymer units.

In a second aspect, the disclosure relates to an omniphobic compatibilizer comprising: a polymerization reaction product between: a first vinyl monomer, optionally a second vinyl crosslinking monomer, and a functionalized omniphobic polymer (e.g., PDMS) having a glass transition temperature ($T_g$) of 70° C. or less, the functionalized omniphobic polymer comprising at least one free radical initiator functional group. The functionalized omniphobic polymer (e.g., PDMS or otherwise) has at least one (e.g., one, two, three, more than three) free radical initiator functional group. The initiator functional group of the functionalized omniphobic polymer allows the functionalized omniphobic polymer to serve as a macroinitiator, which can initiate vinyl polymerization of the first vinyl monomer either alone or in combination with the second vinyl crosslinking monomer (when present). Generally only the vinyl groups of the components react at this stage, so the omniphobic compatibilizer is essentially a linear polymer. The functionalized omniphobic polymer is generally incorporated into the vinyl polymer reaction product as terminating (e.g., predominantly) or backbone (e.g., less common or not present) segments of functionalized omniphobic polymer resulting from its function as a macroinitiator. The free radical initiator functional group can be an analog of azobisisobutyonitrile as described above, for example more generally including an azo-linkage. For example, the functionalized omniphobic polymer can be a reaction product of 4,4'-azobis(4-cyanovaleric acid) with an omniphobic polymer such as PDMS or otherwise with two terminal amino groups to provide two corresponding N═N initiating groups that are amide-linked to the omniphobic polymer. During initiation, the N═N initiating groups are cleaved to form free radical groups that initiate vinyl polymerization while incorporating the functionalized omniphobic polymer into the growing vinyl polymerization chain. A functionalized omniphobic polymer including an initiator group other than an azo group can include peroxide groups, persulfate groups, or other suitable free radical initiating moieties.

In the second aspect, the polymerization reaction product and corresponding omniphobic compatibilizer is generally formed via suitable vinyl polymerization conditions, but it does not need a separate free-radical initiator due to the functionalized omniphobic polymer serving as a macroinitiator. For example, the polymerization of an azo group-containing PDMS can be performed in toluene at 65° C. for 8 h, but other reaction solvents, times, and temperatures can be used as desired. If a PDMS-peroxide or a PDMS-persulfate system is used, free radicals under mild conditions can be generated by one-electron transfer reactions, for example, via redox initiation.

In either aspect, the first vinyl monomer generally has one (e.g., only one) vinyl or unsaturated C═C group for undergoing a vinyl polymerization reaction with the second vinyl crosslinking monomer (when present) and the functionalized omniphobic polymer. Suitable components for the first vinyl monomer can include (meth)acrylate-based monomers in which the (meth)acrylic portion of the monomer is linked (e.g., via an ester bond) to any desired functional group. The functional group is not particularly limited and can be selected to provide desired physical and/or mechanical properties, as well as compatibility with an eventual matrix to which the omniphobic compatibilizer is desirably added. Accordingly, the vinyl monomer can be referenced as a vinyl functional monomer. Suitably, the functional group in particular and the first vinyl monomer more generally does not include other reactive groups for polymerization or crosslinking (i.e., other than its (single) vinyl group), for example epoxide groups, isocyanate groups, amino groups, hydroxyl groups, or carboxylic groups.

In either aspect, the second vinyl crosslinking monomer generally has one (e.g., only one) vinyl or unsaturated C=C group for undergoing a vinyl polymerization reaction with the first vinyl monomer and the functionalized omniphobic polymer. The second vinyl crosslinking monomer also has at least one (e.g., one, two, more than two) other reactive functional group for crosslinking when the omniphobic compatibilizer is added to the eventual polymer matrix. Examples of reactive functional groups for crosslinking include epoxide groups, isocyanate groups, amino groups, hydroxyl groups, and/or carboxylic groups. The reactive functional groups remain substantially in the unreacted form in the compatibilizer (i.e., being intended to react in the eventual polymer matrix). Suitable components for the second vinyl crosslinking monomer can include (meth)acrylate-based monomers in which the (meth)acrylic portion of the monomer is linked (e.g., via an ester bond) to the desired reactive functional group.

Various refinements of the disclosed omniphobic compatibilizer are possible.

In a refinement, the first vinyl monomer has a structure according to formula I or Ia: $CH_2=CR_1R_2$ (I) or $CH_2=CR_1-C(=O)O-R_2'$ (Ia); where: $R_1$, $R_2$, and $R_2'$ are independently selected from hydrogen atoms, halogen atoms (e.g., F, Cl, Br, I), alkyl groups, aryl groups, nitrile groups, ester groups, carboxylic acid groups, ketone groups, ether groups, and heteroatom-substituted (e.g., N-, O-, P-, or S-substituted) derivatives of the foregoing groups. Formula Ia represents an acrylic/acrylate genus within formula I. More generally, $R_1$, $R_2$, and $R_2'$ can be hydrocarbons containing from 1 to 20 carbon atoms or heteroatom-substituted (e.g., N-, O-, P-, or S-substituted) hydrocarbons containing from 1 to 20 carbon atoms. Alternatively or additionally, $R_1$, $R_2$, and $R_2'$ can include linking groups between a desired atom (e.g., halogen) or group (e.g., alkyl, aryl, nitrile, ester, acid, ketone, ether) and a vinyl or ethylenic carbon atom. Such linking groups similarly can be hydrocarbons containing from 1 to 20 carbon atoms or heteroatom-substituted (e.g., N-, O-, P-, or S-substituted) hydrocarbons containing from 1 to 20 carbon atoms. More generally, the various alkyl groups, aryl groups, hydrocarbons, heteroatom-substituted hydrocarbons, and linking groups can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. In formula Ia, the selection of $R_1$ as H corresponds to an acrylate/acrylic acid functional group. In formula Ia, the selection of $R_1$ as $CH_3$ corresponds to a methacrylate/methacrylic acid functional group.

In a refinement, the omniphobic compatibilizer comprises the polymerization reaction product between the first vinyl monomer, the second vinyl crosslinking monomer, and the functionalized omniphobic polymer (e.g., the second vinyl crosslinking monomer is an included component of the polymerization reaction mixture to form the compatibilizer).

In a refinement, the second monomer has a structure according to formula II or IIa: $CH_2=CR_1R_3$ (II) or $CH_2=CR_1-C(=O)O-R_3'$ (IIa); where: $R_1$ is selected from hydrogen atoms, halogen atoms (e.g., F, Cl, Br, I), alkyl groups, aryl groups, nitrile groups, ester groups, carboxylic acid groups, ketone groups, ether groups, and heteroatom-substituted (e.g., N-, O-, P-, or S-substituted) derivatives of the foregoing groups; and $R_3$ and $R_3'$ comprise (i) a reactive functional group selected from epoxide groups, isocyanate groups, amino groups, hydroxyl groups, carboxylic groups, and combinations thereof (e.g., same or different reactive functional groups can be used when there are two or more reactive functional groups), and (ii) a linking group selected from hydrocarbons containing from 1 to 20 carbon atoms and heteroatom-substituted (e.g., N-, O-, or P-substituted) hydrocarbons containing from 1 to 20 carbon atoms. Formula Ia represents an acrylic/acrylate genus within formula I. More generally, $R_1$ can include hydrocarbons containing from 1 to 20 carbon atoms or heteroatom-substituted (e.g., N-, O-, P-substituted) hydrocarbons containing from 1 to 20 carbon atoms. Alternatively or additionally, $R_1$ can include a linking group between a desired atom (e.g., halogen) or group (e.g., alkyl, aryl, nitrile, ester, acid, ketone, ether) and a vinyl or ethylenic carbon atom. Such linking groups similarly can be hydrocarbons containing from 1 to 20 carbon atoms or heteroatom-substituted (e.g., N-, O-, P-substituted) hydrocarbons containing from 1 to 20 carbon atoms. More generally, the various alkyl groups, aryl groups, hydrocarbons, heteroatom-substituted hydrocarbons, and linking groups can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. In formula IIa, selection of $R_1$ as H corresponds to an acrylate/acrylic acid functional group. In formula IIa, selection of $R_1$ as $CH_3$ corresponds to a methacrylate/methacrylic acid functional group. Suitable $R_3$ and $R_3'$ reactive functional groups can include a linking group with 1, 2, or 3 carbon atoms (e.g., a methylene, ethylene, propylene group) forming an ester linkage with a vinyl or acrylic portion of the monomer at one end of the linking group and having the reactive functional group at the other end. Examples include a hydroxyalkyl group (e.g., hydroxyethyl group in 2-hydroxyethylmethacrylate (HEMA) or otherwise), a glycidyl group (e.g., in glycidyl methacrylate or otherwise), an aminoalkyl group (e.g., aminoethyl group in 2-aminoethylmethacrylate or otherwise), an iscyanatoalkyl group (e.g., iscyanatoethyl group in 2-iscyanatoethylmethacrylate or otherwise), a haloalkyl group (e.g., 2-chloroethyl acrylate or otherwise); an N-hydroxy alkyl group (e.g., methacrylic acid N-hydroxysuccinimide ester or otherwise).

In a refinement, the functionalized omniphobic polymer is selected from the group consisting of functionalized polysiloxanes, functionalized polyperfluoroethers, functionalized polyisobutenes, functionalized branched polyolefins, functionalized low molecular weight polyolefins, functionalized poly(meth)acrylates, and combinations thereof.

In a refinement, the functionalized omniphobic polymer has a glass transition temperature in a range from −150° C. to 70° C.

In a refinement, the functionalized omniphobic polymer is a liquid at a temperature in a range from 0° C. or 10° C. to 40° C.

In a refinement, the functionalized omniphobic polymer has a molecular weight ranging from 300 to 50,000 g/mol.

The relative amounts of the first vinyl monomer, the second vinyl crosslinking monomer, and functionalized omniphobic polymer are not particularly limited. In a refinement, the first vinyl monomer is present in the polymerization reaction product in an amount in a range from 1 to 99 wt. % (or 30 to 70 wt. %) based on the polymerization reaction product; when present, the second vinyl crosslinking monomer is present in the polymerization reaction product in an amount in a range from 0.5 to 20 wt. % (or 1 to 5 wt. %) based on the polymerization reaction product; and the functionalized omniphobic polymer is present in the polymerization reaction product in an amount in a range from 0.05 to 70 wt. % (or 5 to 50 wt. %) based on the polymerization reaction product. For example, the first vinyl monomer can be present in an amount of at least 1, 2, 5, 10, 15, 20, 30, or 40 wt. % and/or up to 40, 50, 60, 70, 80, 90, 95, or 99 wt. %. The second vinyl crosslinking monomer can be present in an amount of at least 0.1, 0.2, 0.5, 1, 1.5, or 2 wt. % and/or up to 1, 2, 3, 5, 10, 15, or 20 wt. %. The functionalized omniphobic polymer can be present in an amount of at least 0.05, 0.2, 1, 2, 5, 8, or 10 wt. % and/or up to 10, 20, 30, 40, 50, 60, or 70 wt. %. The foregoing ranges can be equivalently expressed on the basis of the omniphobic compatibilizer as a whole.

In a third aspect, the disclosure relates to a (UV-curable) thermoset omniphobic composition comprising: a crosslinked polymerization reaction product of a mixture comprising: an omniphobic compatibilizer any of the disclosed embodiments (e.g., not including the second vinyl crosslinking monomer), a third vinyl monomer, a fourth polyvinyl crosslinking monomer, and a UV-curing catalyst. The third vinyl monomer generally can be the same as the first vinyl monomer, or it can be selected from the same general class of compounds. The third vinyl monomer undergoes vinyl polymerization with the fourth polyvinyl crosslinking monomer and (optionally in some embodiments) the omniphobic compatibilizer. The fourth polyvinyl crosslinking monomer is not particularly limited and can include any compound with two or more vinyl or unsaturated C=C groups for undergoing a vinyl polymerization and crosslinking reactions with the third vinyl monomer and (optionally in some embodiments) the omniphobic compatibilizer. The fourth polyvinyl crosslinking monomer can include an ester reaction product between a polyol and a (meth)acrylic acid. The UV-curing catalyst is generally not consumed in the curing reaction, but would be present/blended in the final cured product after UV-initiated curing. The photoinitiator can be selected from various classes including, but not limited to, acetophenone compounds, benzyl and benzoin compounds, benzophenone compounds, cationic photoinitiators, and thioxanthone compounds, for example. The crosslinked polymerization reaction product and corresponding thermoset omniphobic composition is generally formed via UV curing conditions. Curing is performed by exposing the mixture of monomers, catalyst, and omniphobic compatibilizer to UV light, typically for about 5 s to 180 s under ambient conditions, preferably solvent-free.

In a refinement, the omniphobic compatibilizer is the omniphobic compatibilizer according to the first aspect (e.g., preferably not including the second vinyl crosslinking monomer), and the omniphobic compatibilizer is present in the thermoset omniphobic composition as one or both of (i) a physical blend with the crosslinked reaction product between the third vinyl monomer and the fourth polyvinyl crosslinking monomer, and (ii) a crosslinked reaction product between the omniphobic compatibilizer, the third vinyl monomer, and the fourth polyvinyl crosslinking monomer. In this refinement, upon UV curing, the PDMS or other omniphobic compatibilizer can form a physical blend with the cured polymer when the omniphobic polymer chains form links between adjacent compatibilizer chains (i.e., all vinyl groups in a given omniphobic polymer are reacted and incorporated into the omniphobic compatibilizer). Alternatively, the omniphobic compatibilizer can be crosslinked and incorporated into the cured polymer network when the omniphobic polymer chains are pendant with a free vinyl group (i.e., not all vinyl groups in a given omniphobic polymer are reacted and incorporated into the omniphobic compatibilizer). Either or both options are possible for a given omniphobic compatibilizer, and in either case, the omniphobic polymer component imparts omniphobic properties to the coating.

In a refinement, the omniphobic compatibilizer is the omniphobic compatibilizer according to the second aspect (e.g., preferably not including the second vinyl crosslinking monomer), and the omniphobic compatibilizer is present in the thermoset omniphobic composition as a physical blend with the crosslinked reaction product between the third vinyl monomer and the fourth polyvinyl crosslinking monomer. In this refinement, upon UV curing, the PDMS or other omniphobic compatibilizer forms a physical blend with the cured polymer. There is no crosslinking of the omniphobic compatibilizer with the UV-cured polymer, since the omniphobic compatibilizer is a linear polymer with no free/pendant vinyl groups.

In a refinement, the fourth polyvinyl crosslinking monomer is an ester reaction product between (i) an acrylic acid compound and (ii) a polyol selected from the group consisting of polyether polyols, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, isosorbide, and combinations thereof. The acrylic acid compound can be represented by $CH_2=CR_1-C(=O)OH$, where $R_1$ can be as described above.

In a refinement, the thermoset omniphobic composition further comprises one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

The relative amounts of the omniphobic compatibilizer, the third vinyl monomer, and the fourth polyvinyl crosslinking monomer are not particularly limited. In a refinement, the third vinyl monomer is present in the crosslinked polymerization reaction product in an amount in a range from 5 to 98 wt. % (or 80 to 90 wt. %, or 70 to 98 wt. %) based on the crosslinked polymerization reaction product; the omniphobic compatibilizer is present in the crosslinked polymerization reaction product in an amount in a range from 0.5 to 20 wt. % (or 1 to 10 wt. %) based on the crosslinked polymerization reaction product; and the fourth polyvinyl crosslinking monomer is present in the crosslinked polymerization reaction product in an amount in a range from 0.5 to 20 wt. % (or 1 to 10 wt. %) based on the crosslinked polymerization reaction product. For example, the third vinyl monomer can be present in an amount of at least 5, 10, 20, 30, 40, 50, 60, 70, 75, or 80 wt. % and/or up to 50, 60, 70, 75, 80, 85, or 90 wt. %. The omniphobic compatibilizer can be present in an amount of at least 0.5, 1, 1.5, 2, or 3 wt. % and/or up to 5, 8, 10, 15, 20, or 25 wt. %. The fourth polyvinyl crosslinking monomer can be present in an amount of at least 0.2, 0.5, 1, 2 or 4 wt. % and/or up to 5, 8, 10, 12, 15, or 20 wt. %. The foregoing ranges can be equivalently expressed on the basis of the thermoset omniphobic composition as a whole.

In a fourth aspect, the disclosure relates to a (non-UV-curable) thermoset omniphobic composition comprising: a crosslinked polymerization reaction product of a mixture comprising: the omniphobic compatibilizer according to any of the variously disclosed embodiments including the second vinyl crosslinking monomer, a first thermosetting component comprising functional groups reactive with crosslinking groups of the second vinyl crosslinking monomer in the omniphobic compatibilizer, and a second thermosetting component comprising functional groups reactive with the first thermosetting component (e.g., where the second thermosetting component's reactive functional groups can be the same as the reactive functional groups in the second vinyl crosslinking monomer). The first and second thermosetting components can be conventional thermoset components, such as a polyisocyanate/polyol system (e.g., for a polyurethane) or an amine/polyepoxide system (e.g., for an epoxide resin). The reactive functional group in the second vinyl crosslinking monomer is suitably selected to be one of the same functional groups in the conventional thermoset components. No UV irradiation is required for curing. The end result is that the PDMS or other omniphobic compatibilizer is necessarily incorporated into the crosslinked thermoset network, regardless of whether it had pendant, linking, terminating, or backbone omniphobic chains. The crosslinked polymerization reaction product and corresponding thermoset omniphobic composition is generally formed via non-UV curing conditions (e.g., ambient temperature or elevated temperature curing conditions, with or without a non-UV catalyst) depend on the chemistry being used. For example, in the case of an epoxy-amine system, curing can be performed at room temperature or generally accelerated at higher temperature (e.g., 120° C.).

In a refinement, the first thermosetting component comprises a polyisocyanate or a polyol; the second thermosetting component comprises the other of the polyisocyanate and the polyol; and the second vinyl crosslinking monomer comprises at least one of an isocyanate group and a hydroxyl group. For example, the first thermosetting component can comprise the polyisocyanate; the second thermosetting component can comprise the polyol; and the second vinyl crosslinking monomer can comprise the hydroxyl group. The polyisocyanate can be selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethyl-hexane, 1-iso-cyanatomethyl-3-isocyanato-1,5,5-trimethyl-cyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatodo-decane, and combinations thereof. The polyol can be selected from the group consisting of polyether polyols, hydroxlated (meth)acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols, isosorbide, and combinations thereof.

In a refinement, the first thermosetting component and the second thermosetting component together correspond to a thermoset epoxy.

In a refinement, the first thermosetting component comprises a polyepoxide or an amine; the second thermosetting component comprises the other of the polyepoxide and the amine; and the second vinyl crosslinking monomer comprises at least one of an epoxide group and an amino group. For example, the first thermosetting component can comprise the amine; the second thermosetting component can comprise the polyepoxide; and the second vinyl crosslinking monomer can comprise the epoxide group. The polyepoxide can be selected from the group consisting of polyepoxide-substituted aromatic hydrocarbons, aliphatic hydrocarbons, cycloaliphatic hydrocarbons, ethers thereof, esters thereof, imines thereof, and combinations thereof. The amine can be selected from the group consisting of polyamine-substituted aromatic hydrocarbons, aliphatic hydrocarbons, cycloaliphatic hydrocarbons, ethers thereof, esters thereof, imines thereof, and combinations thereof.

In a refinement, the thermoset omniphobic composition further comprises one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

The relative amounts of the omniphobic compatibilizer, the first thermosetting component, and the second thermosetting component are not particularly limited. In a refinement, the omniphobic compatibilizer is present in the crosslinked polymerization reaction product in an amount in a range from 0.5 to 20 wt. % (or 1 to 10 wt. %) based on the crosslinked polymerization reaction product; the first thermosetting component is present in the crosslinked polymerization reaction product in an amount in a range from 5 to 90 wt. % (or 10 to 60 wt. %) based on the crosslinked polymerization reaction product; and the second thermosetting component is present in the crosslinked polymerization reaction product in an amount in a range from 5 to 90 wt. % (or 10 to 60 wt. %) based on the crosslinked polymerization reaction product. For example, the omniphobic compatibilizer can be present in an amount of at least 0.5, 1, 1.5, 2, or 3 wt. % and/or up to 5, 8, 10, 15, 20, or 25 wt. %. The first thermosetting component can be present in an amount of at least 5, 10, 20, 30, 40, 50, 60, or 70 wt. % and/or up to 40, 50, 60, 70, 80, or 90 wt. %. The second thermosetting component can be present in an amount of at least 5, 10, 20, 30, 40, 50, 60, or 70 wt. % and/or up to 40, 50, 60, 70, 80, or 90 wt. %. The foregoing ranges can be equivalently expressed on the basis of the thermoset omniphobic composition as a whole.

In another aspect, the disclosure relates to a coated article comprising: (a) a substrate; and (b) a thermoset omniphobic composition according to any of the variously disclosed embodiments coated on a surface of the substrate. In a refinement, the substrate is selected from the group of metal, plastics, a different thermoset material, glass, wood, fabric (or textile), and ceramics. In a refinement, the thermoset omniphobic composition has a thickness ranging from 0.01 µm to 500 µm. In a refinement, the thermoset omniphobic composition coating is scratch-resistant, ink-resistant, and optically clear.

While the disclosed methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

Figure 1:
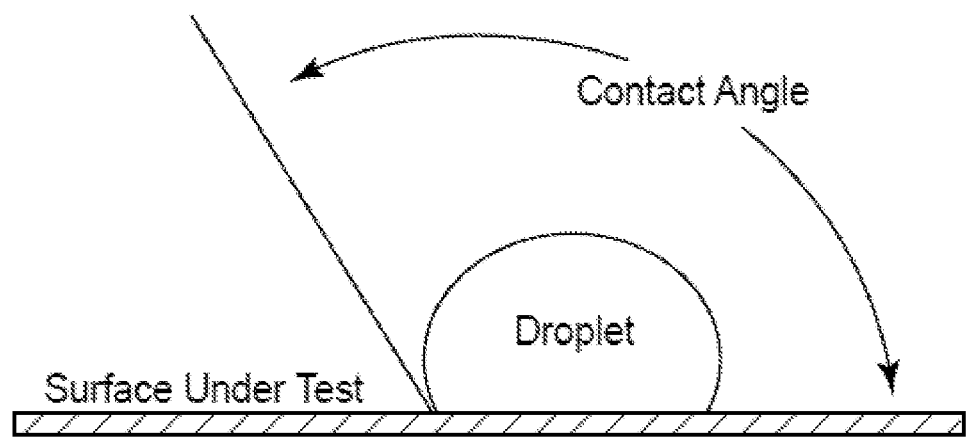
FIG. 1 is a diagram illustrating measurement of a contact angle for a liquid droplet on a surface.
Figure 2:
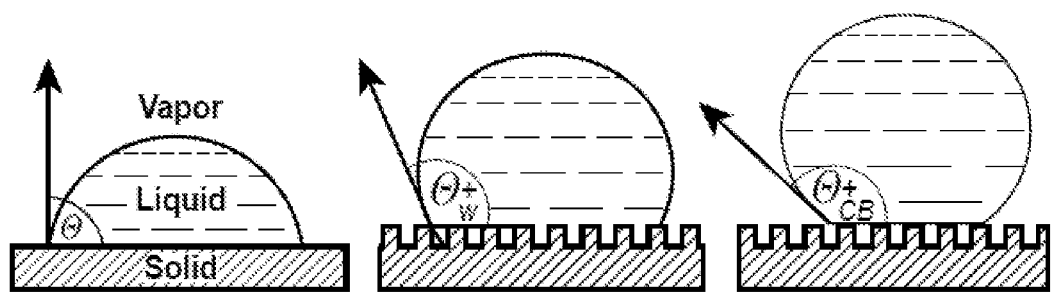
FIG. 2 is a diagram illustrating how contact angles for a given liquid droplet on a surface can vary as a function of surface topology (e.g., flat or smooth surface vs. textured surfaces).

The disclosure generally relates to omniphobic compatibilizers, which include a polymerization reaction product between a first vinyl monomer, optionally a second vinyl crosslinking monomer, and a functionalized omniphobic polymer. The functionalized omniphobic polymer can include two or more vinyl functional groups or at least one free radical initiator functional group such that the reaction product forming the omniphobic compatibilizer can be a vinyl or free-radical polymerization product. The omniphobic compatibilizer can be incorporated into a thermoset omniphobic composition, for example UV-curable or a non-UV-curable thermoset composition. A UV-curable thermoset omniphobic composition can be a crosslinked polymerization reaction product between the omniphobic compatibilizer, a third vinyl monomer, and a fourth polyvinyl crosslinking monomer. A non-UV-curable thermoset omniphobic composition can be a crosslinked polymerization reaction product between the omniphobic compatibilizer, a first thermosetting component, and a second thermosetting component. The thermoset omniphobic composition can be a coating on a substrate in a corresponding coated article.

The disclosed composition includes a polymer (e.g., the thermoset omniphobic composition) which can be used as a coating with the ability to bind to metal, glass, wood, fabrics, and ceramics with relative ease, in particular due to the strong adhesive properties of its thermoset constituents (e.g., such as for polyurethane or epoxy thermoset constituents). The polymer coating has an omniphobic quality, repelling water, oils, inks, and spray paints, thus allowing for a coating that not only has typical hydrophobic and oleophobic properties, but also protects a surface from pen inks and various paints. The final polymer product is optically clear (even for relatively thick coatings), making it an ideal choice for coating computer and phone screens as well as windows. The polymer can be manufactured without fluorine as a component and/or as a one-pot reaction process, thus reducing the overall cost when compared to products currently manufactured. Coatings formed from the polymer composition are durable due to the final crosslinked thermoset matrix. The composition can be used in water-repellent, oil-repellent, anti-fingerprint, anti-smudge, and/or anti-graffiti coatings or paints.

Omniphobic Compatibilizer

The omniphobic compatibilizer according to the disclosure generally includes at least two or three components in its polymeric backbone, including a first vinyl monomer, optionally a second vinyl crosslinking monomer, and a functionalized omniphobic polymer. The vinyl monomer(s) and functionalized omniphobic polymer are polymerized to form the corresponding omniphobic compatibilizer, which in turn can be incorporated into a thermoset omniphobic composition for use as a coating, etc. The functionalized omniphobic polymer can include two or more vinyl functional groups or at least one free radical initiator functional group such that the reaction product forming the omniphobic compatibilizer can be a vinyl or free-radical polymerization product.

The first vinyl monomer generally has one (e.g., only one) vinyl or unsaturated C=C group for undergoing a vinyl polymerization reaction with the second vinyl crosslinking monomer (when present) and the functionalized omniphobic polymer. Suitable components for the first vinyl monomer can include (meth)acrylate-based monomers in which the (meth)acrylic portion of the monomer is linked (e.g., via an ester bond) to any desired functional group. The functional group is not particularly limited and can be selected to provide desired physical and/or mechanical properties, as well as compatibility with an eventual matrix to which the omniphobic compatibilizer is desirably added. Accordingly, the vinyl monomer can be referenced as a vinyl functional monomer. Suitably, the functional group in particular and the first vinyl monomer more generally does not include other reactive groups for polymerization or crosslinking (i.e., other than its (single) vinyl group), for example, epoxide groups, isocyanate groups, amino groups, hydroxyl groups, or carboxylic groups.

In various embodiments, the first vinyl monomer has a structure according to formula I or Ia: $CH_2=CR_1R_2$ (I) or $CH_2=CR_1-C(=O)O-R_2'$ (Ia). $R_1$, $R_2$, and $R_2'$ are independently selected from hydrogen atoms, halogen atoms (e.g., F, Cl, Br, I), alkyl groups, aryl groups, nitrile groups, ester groups, carboxylic acid groups, ketone groups, ether groups, and heteroatom-substituted (e.g., N-, O-, P-, or S-substituted) derivatives of the foregoing groups. Formula Ia represents an acrylic/acrylate genus within formula I. More generally, $R_1$, $R_2$, and $R_2'$ can be hydrocarbons containing from 1 to 20 carbon atoms or heteroatom-substituted (e.g., N-, O-, P-, or S-substituted) hydrocarbons containing from 1 to 20 carbon atoms. Alternatively or additionally, $R_1$, $R_2$, and $R_2'$ can include linking groups between a desired atom (e.g., halogen) or group (e.g., alkyl, aryl, nitrile, ester, acid, ketone, ether) and a vinyl or ethylenic carbon atom. Such linking groups similarly can be hydrocarbons containing from 1 to 20 carbon atoms or heteroatom-substituted (e.g., N-, O-, P-, or S-substituted) hydrocarbons containing from 1 to 20 carbon atoms. More generally, the various alkyl groups, aryl groups, hydrocarbons, heteroatom-substituted hydrocarbons, and linking groups can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. In formula Ia, selection of $R_1$ as H corresponds to an acrylate/acrylic acid functional group. In formula Ia, selection of $R_1$ as $CH_3$ corresponds to a methacrylate/methacrylic acid functional group.

The second vinyl crosslinking monomer generally has one (e.g., only one) vinyl or unsaturated C═C group for undergoing a vinyl polymerization reaction with the first vinyl monomer and the functionalized omniphobic polymer. The second vinyl crosslinking monomer also has at least one (e.g., one, two, more than two) other reactive functional group for crosslinking when the omniphobic compatibilizer is added to the eventual polymer matrix. Example reactive functional groups for crosslinking include epoxide groups, isocyanate groups, amino groups, hydroxyl groups, and/or carboxylic groups. The reactive functional groups remain substantially in unreacted form in the compatibilizer (i.e., being intended to react in the eventual polymer matrix). Suitable components for the second vinyl crosslinking monomer can include (meth)acrylate-based monomers in which the (meth)acrylic portion of the monomer is linked (e.g., via an ester bond) to the desired reactive functional group.

In various embodiments the second monomer has a structure according to formula II or IIa: $CH_2$═$CR_1R_3$ (II) or $CH_2$═$CR_1$—C(═O)O—$R_3'$ (IIa). $R_1$ is selected from hydrogen atoms, halogen atoms (e.g., F, Cl, Br, I), alkyl groups, aryl groups, nitrile groups, ester groups, carboxylic acid groups, ketone groups, ether groups, and heteroatom-substituted (e.g., N-, O-, P-, or S-substituted) derivatives of the foregoing groups. $R_3$ and $R_3'$ include (i) a reactive functional group selected from epoxide groups, isocyanate groups, amino groups, hydroxyl groups, carboxylic groups, and combinations thereof (e.g., same or different reactive functional groups can be used when there are two or more reactive functional groups), and (ii) a linking group selected from hydrocarbons containing from 1 to 20 carbon atoms and heteroatom-substituted (e.g., N-, O-, or P-substituted) hydrocarbons containing from 1 to 20 carbon atoms. Formula Ia represents an acrylic/acrylate genus within formula I. More generally, $R_1$ can include hydrocarbons containing from 1 to 20 carbon atoms or heteroatom-substituted (e.g., N-, O-, P-substituted) hydrocarbons containing from 1 to 20 carbon atoms. Alternatively or additionally, $R_1$ can include a linking group between a desired atom (e.g., halogen) or group (e.g., alkyl, aryl, nitrile, ester, acid, ketone, ether) and a vinyl or ethylenic carbon atom. Such linking groups similarly can be hydrocarbons containing from 1 to 20 carbon atoms or heteroatom-substituted (e.g., N-, O-, P-substituted) hydrocarbons containing from 1 to 20 carbon atoms. More generally, the various alkyl groups, aryl groups, hydrocarbons, heteroatom-substituted hydrocarbons, and linking groups can be linear, branched, and/or cyclic, aliphatic and/or aromatic, saturated and/or unsaturated, etc., for example having at least 1, 2, 3, 4, 6, 8, or 10 and/or up to 2, 4, 6, 8, 10, 12, 15, or 20 carbon atoms. In formula IIa, selection of $R_1$ as H corresponds to an acrylate/acrylic acid functional group. In formula IIa, selection of $R_1$ as $CH_3$ corresponds to a methacrylate/methacrylic acid functional group. Suitable $R_3$ and $R_3'$ reactive functional groups can include a linking group with 1, 2, or 3 carbon atoms (e.g., a methylene, ethylene, propylene group) forming an ester linkage with a vinyl or acrylic portion of the monomer at one end of the linking group and having the reactive functional group at the other end. Examples include a hydroxyalkyl group (e.g., hydroxyethyl group in 2-hydroxyethylmethacrylate (HEMA) or otherwise), a glycidyl group (e.g., in glycidyl methacrylate or otherwise), an aminoalkyl group (e.g., aminoethyl group in 2-aminoethylmethacrylate or otherwise), an iscyanatoalkyl group (e.g., iscyanatoethyl group in 2-iscyanatoethylmethacrylate or otherwise), a haloalkyl group (e.g., 2-chloroethyl acrylate or otherwise); an N-hydroxy alkyl group (e.g., methacrylic acid N-hydroxysuccinimide ester or otherwise).

The functionalized omniphobic polymer is not particularly limited and generally can include any omniphobic polymer with glass transition temperature of 70° C. or 50° C. or less, such as in a range from −150° C. to 70° C. or 50° C. In various embodiments, the functionalized omniphobic polymer has a glass transition temperature in a range from −150° C. to 70° C. or 50° C. (e.g., at least −150° C., −120° C., −100° C., or −50° C. and/or up to −10° C., 0° C., 10° C., 20° C., 30° C., 40° C., 50° C., 60° C., or 70° C.). The functionalized omniphobic polymer can be either in a liquid or a rubbery state at common use temperatures of the final coating, for example in a range from 10° C. to 40° C. or 20° C. to 30° C. In various embodiments, the functionalized omniphobic polymer is a liquid at a temperature in a range from 10° C. to 40° C. (e.g., from 20° C. to 30° C., or about room temperature, such as where the functionalized omniphobic polymer has a melting temperature (Tm) below 10° C. or 20° C.). The functional group of the functionalized omniphobic polymer can include two or more vinyl functional groups or at least one free radical initiator functional group such that the reaction product forming the omniphobic compatibilizer can be a vinyl or free-radical polymerization product. Examples of general classes of functionalized omniphobic polymers include functionalized polysiloxanes, functionalized polyperfluoroethers, functionalized polybutadienes, functionalized polyolefins (e.g., polyethylene, polypropylene, polybutylene), and combinations or mixtures thereof. The functionalized polyperfluoroether (e.g., functionalized polyperfluoropolyethers) can include mono-, di-, or higher functionalized polyperfluoroethers, or a blend of thereof, such as a blend of mono- and di-functional polyperfluorothers. In some embodiments, the functionalized omniphobic polymer can be free from fluorine or fluorinated components (e.g., not using functionalized polyperfluoroethers or other fluorine-containing components). The functionalized polybutadiene can include mono-, di-, or higher functional polybutadienes, or a blend of thereof, such as a blend mono- and di-functional polybutadienes. Many suitable functionalized omniphobic polymers are commercially available (e.g., vinyl-functional polydimethylsiloxane (PDMS) with a variety of available degrees of functionality and molecular weights). Omniphobic polymers that are not commercially available in their functionalized form can be functionalized using conventional chemical synthesis techniques, for example including but not limited to amidation of an amino-functional omniphobic polymer with a carboxylic-functional free-radical initiator (e.g., AIBN derivative).

The functionalized polysiloxane is not particularly limited and generally can include any polysiloxane having mono-, di-, or higher degrees functionality. In some embodiments, the functionalized polysiloxane includes a mono-functional polysiloxane. In some embodiments, the functionalized polysiloxane includes a di-functional polysiloxane, in particular a divinyl-functional polysiloxane. The polysiloxane can be a polydialklylsiloxane having —Si($R_1R_2$)—O— repeat units, where $R_1$ and $R_2$ independently can be $C_1$-$C_{12}$ linear or branched alkyl groups, $C_4$-$C_{12}$ cycloalkyl groups, unsubstituted aromatic groups, or substituted aromatic groups, in particular where $R_1$ and $R_2$ are methyl groups for a polydimethylsiloxane (PDMS). The functional groups are suitably terminal groups. The functional groups additionally can be pendant groups. Some examples of functionalized polyslioxanes include functionalized polydimethylsiloxane, functionalized polymethylphenylsiloxane, and functionalized polydiphenylsiloxane.

Some examples of polyperfluoropolyethers with functional group(s) include functionalized poly(n-hexafluoropropylene oxide) (e.g., —($CF_2CF_2CF_2O$)n-) and functionalized poly(hexafluoroisopropylene oxide) (e.g., —(CF($CF_3$)$CF_2$O)n-). Some examples of functionalized atactic polyolefins include functionalized poly(1-butene), branched polyethylene, poly(cis-isoprene), poly(trans-isoprene), and poly (1-octene). Some examples of functionalized polyacrylates include poly(3-functionalized propyl acrylate). Similarly, mono-functional polymers include mono-functional polyisobutylene, mono-functional polypolyethylene glycol, mono-functional poly(1-butene). The foregoing can be used as the low-glass transition temperature ($T_g$ less than 70° C. or 50° C.) polymers, either alone or in combination with other functionalized omniphobic polymers.

The functionalized omniphobic polymers can have any suitable molecular weight in view of desired glass transition temperature, for example having a molecular weight ranging from 300 to 50,000 g/mol. In various embodiments, the molecular weight can be at least 300, 800, 1000, 1500, or 2000 and/or up to 1000, 2000, 3000, 5000, or 50,000 g/mol. The molecular weight can be expressed as a number-average or weight-average value in the units of gram/mole (g/mol). Alternatively or additionally, the functionalized omniphobic polymer can have a number of repeat units ranging from 4 to 600 (e.g., at least 4, 10, 12, 15, 20, or 25 and/or up to 12, 15, 20, 30, 40, 60, 200, or 600; such as a (number) average number of repeat units). Alternatively or additionally, the functionalized omniphobic polymer can be a liquid at a temperature in a range from 0° C. or 10° C. to 40° C. Some embodiments can include a blend of two or more functionalized omniphobic polymers with different average molecular weights, such as one with 300-1500 g/mol and another with 1500-50,000 g/mol with a higher average molecular weight than the first. Blends of functionalized omniphobic polymers (e.g., differing in molecular weight and/or in degree of functionality) can improve the combination of water- and oil-repellency properties of the final composition. Low MW functionalized polysiloxanes (e.g., PDMS, such as having a MW range of about 800-1200 g/mol or an average MW of about 1000 g/mol) can provide an improved water repellency, while Higher MW functionalized polysiloxanes (e.g., PDMS, such as about 2000 g/mol or above for an average or range of MW) can provide an improved oil repellency.

In various embodiments, the functionalized omniphobic polymer has two or more vinyl functional groups, for example being a di-vinyl functionalized omniphobic polymer. The vinyl functional groups can be added to the omniphobic polymer by any suitable method. For example, an omniphobic polymer such as PDMS or otherwise with two terminal amino groups can be reacted with (meth) acrylic acid to provide two corresponding terminal vinyl groups with an amide linkage to the omniphobic polymer. Similarly, PDMS-acrylate or PDMS-methacrylate (e.g., di-(meth)acrylates) can be prepared by PDMS-OH and (meth) acryloyl halide (e.g., Cl, Br). Other methods such as condensation of PDMS-OH and (meth)acrylic acid also can be used. The vinyl groups on the omniphobic polymer may be same (e.g., methacrylate-PDMS-methacrylate) or different (e.g., methacrylate-PDMS-acrylate) in nature.

In a particular embodiment, the polymerization reaction product is a block copolymer. The polymerization reaction can include block polymerization segments having first vinyl monomer backbone units and (when present) second vinyl crosslinking monomer units, but no functionalized omniphobic polymer backbone units. The polymerization reaction can further include random polymerization segments having first vinyl monomer backbone units, second vinyl crosslinking monomer units (when present), and functionalized omniphobic polymer backbone units. Initial polymerization of the first vinyl monomer (optionally in combination with the second vinyl crosslinking monomer) in the absence of the functionalized omniphobic polymer creates block backbone units that do not have any functionalized omniphobic polymer, in which the blocks serve as spacers to keep the functional omniphobic polymer chains sufficiently far apart to avoid tight crosslinking/gelling when the functionalized omniphobic polymer is subsequently added to the polymerization reaction mixture, at which time random copolymerization continues with all of the monomer units. The final copolymer structure includes block segments with (i) first vinyl monomer units, but no functionalized omniphobic polymer units, (ii) first and second vinyl monomer units (e.g., in a random copolymer block), but no functionalized omniphobic polymer units, etc. The final copolymer structure further includes random copolymer segments joining the block segments, where the random copolymer segments include first vinyl monomer units, second vinyl monomer units (when included), and functionalized omniphobic polymer units.

In various embodiments, the functionalized omniphobic polymer has at least one free radical initiator functional group, for example having one, two, three, or more than three free radical initiator functional groups. The initiator functional group of the functionalized omniphobic polymer allows the functionalized omniphobic polymer to serve as a macroinitiator, which can initiate vinyl polymerization of the first vinyl monomer either alone or in combination with the second vinyl crosslinking monomer (when present). Generally only the vinyl groups of the components react at this stage, so the omniphobic compatibilizer is essentially a linear polymer. The functionalized omniphobic polymer is generally incorporated into the vinyl polymer reaction product as terminating (e.g., predominantly) or backbone (e.g., less common or not present) segments of functionalized omniphobic polymer resulting from its function as a macroinitiator. The free radical initiator functional group can be an analog of azobisisobutyonitrile as described above, for example more generally including an azo-linkage. For example, the functionalized omniphobic polymer can be a reaction product of 4,4'-azobis(4-cyanovaleric acid) with an omniphobic polymer such as PDMS or otherwise with two terminal amino groups to provide two corresponding N=N initiating groups that are amide-linked to the omniphobic polymer. During initiation, the N=N initiating groups are cleaved to form free radical groups that initiate vinyl polymerization while incorporating the functionalized omniphobic polymer into the growing vinyl polymerization chain. A functionalized omniphobic polymer including an initiator group other than an azo group can include peroxide groups, persulfate groups, or other suitable free radical initiating moieties.

The relative amounts of the first vinyl monomer, the second vinyl crosslinking monomer, and functionalized omniphobic polymer in the omniphobic compatibilizer are not particularly limited. For example, the first vinyl monomer can be present in the polymerization reaction product in an amount in a range from 1 to 99 wt. % (or 30 to 70 wt. %) based on the polymerization reaction product. When present, the second vinyl crosslinking monomer can be present in the polymerization reaction product in an amount in a range from 0.5 to 20 wt. % (or 1 to 5 wt. %) based on the polymerization reaction product. The functionalized omniphobic polymer can be present in the polymerization reaction product in an amount in a range from 0.05 to 70 wt. % (or 5 to 50 wt. %) based on the polymerization reaction product. For example, the first vinyl monomer can be present in an amount of at least 1, 2, 5, 10, 15, 20, 30, or 40 wt. % and/or up to 40, 50, 60, 70, 80, 90, 95, or 99 wt. %. The second vinyl crosslinking monomer can be present in an amount of at least 0.1, 0.2, 0.5, 1, 1.5, or 2 wt. % and/or up to 1, 2, 3, 5, 10, 15, or 20 wt. %. The functionalized omniphobic polymer can be present in an amount of at least 0.05, 0.2, 1, 2, 5, 8, or 10 wt. % and/or up to 10, 20, 30, 40, 50, 60, or 70 wt. %. The foregoing ranges can be equivalently expressed on the basis of the omniphobic compatibilizer as a whole.

Omniphobic Composition

The omniphobic compatibilizer can be incorporated into a thermoset omniphobic composition, for example UV-curable or a non-UV-curable thermoset composition. The thermoset omniphobic compositions according to the disclosure generally include crosslinked polymerization reaction product between the omniphobic compatibilizer and at least one further monomer or polymerization component, where at least one of the omniphobic compatibilizer and the further monomer or polymerization component contains a crosslinking functionality (e.g., a functional group or groups able to participate in two or more polymerization reactions). In some embodiments, the omniphobic compatibilizer does not include crosslinking functionality (e.g., no second vinyl crosslinking monomer was used), but the omniphobic compatibilizer is combined with at least one crosslinking monomer when forming the thermoset omniphobic composition. In some embodiments, the omniphobic compatibilizer does include crosslinking functionality (e.g., a second vinyl crosslinking monomer was used), so the omniphobic compatibilizer can be combined with non-crosslinking monomers or crosslinking monomers when forming the thermoset omniphobic composition. For example, a UV-curable thermoset omniphobic composition can be a crosslinked polymerization reaction product between the omniphobic compatibilizer, a third vinyl monomer, and a fourth polyvinyl crosslinking monomer. Similarly, a non-UV-curable thermoset omniphobic composition can be a crosslinked polymerization reaction product between the omniphobic compatibilizer, a first thermosetting component, and a second thermosetting component.

In some embodiments, the thermoset omniphobic composition is a crosslinked polymerization reaction product of a mixture, including an omniphobic compatibilizer any of the disclosed embodiments (e.g., with or without the second vinyl crosslinking monomer), a third vinyl monomer, a fourth polyvinyl crosslinking monomer, and a UV-curing catalyst. The third vinyl monomer generally can be the same as the first vinyl monomer, or it can be selected from the same general class of compounds as described above for the first vinyl monomer. The third vinyl monomer undergoes vinyl polymerization with the fourth polyvinyl crosslinking monomer and (optionally in some embodiments) the omniphobic compatibilizer. The fourth polyvinyl crosslinking monomer is not particularly limited and can include any compound with two or more vinyl or unsaturated C=C groups for undergoing a vinyl polymerization and crosslinking reactions with the third vinyl monomer and (optionally in some embodiments) the omniphobic compatibilizer. The fourth polyvinyl crosslinking monomer can include an ester reaction product between a polyol and a (meth)acrylic acid. The UV-curing catalyst is generally not consumed in the curing reaction, but would be present/blended in the final cured product after UV-initiated curing. The photoinitiator can be selected from various classes including, but not limited to, acetophenone compounds, benzyl and benzoin compounds, benzophenone compounds, cationic photoinitiators, and thioxanthone compounds, for example. The crosslinked polymerization reaction product and corresponding thermoset omniphobic composition is generally formed via UV curing conditions. Curing is performed by exposing the mixture of monomers, catalyst, and omniphobic compatibilizer to UV light, typically for about 5 s to 180 s under ambient conditions, preferably solvent-free.

In an embodiment, the omniphobic compatibilizer includes the functionalized omniphobic polymer with two or more vinyl functional groups (e.g., preferably not including the second vinyl crosslinking monomer), and the omniphobic compatibilizer is present in the thermoset omniphobic composition as one or both of (i) a physical blend with the crosslinked reaction product between the third vinyl monomer and the fourth polyvinyl crosslinking monomer, and (ii) a crosslinked reaction product between the omniphobic compatibilizer, the third vinyl monomer, and the fourth polyvinyl crosslinking monomer. In this embodiment, upon UV curing, the PDMS or other omniphobic compatibilizer can form a physical blend with the cured polymer when the omniphobic polymer chains form links between adjacent compatibilizer chains (i.e., all vinyl groups in a given omniphobic polymer are reacted and incorporated into the omniphobic compatibilizer). Alternatively, the omniphobic compatibilizer can be crosslinked and incorporated into the cured polymer network when the omniphobic polymer chains are pendant with a free vinyl group (i.e., not all vinyl groups in a given omniphobic polymer are reacted and incorporated into the omniphobic compatibilizer). Either or both options are possible for a given omniphobic compatibilizer, and in either case, the omniphobic polymer component imparts omniphobic properties to the coating.

In an embodiment, the omniphobic compatibilizer includes the functionalized omniphobic polymer with at least one free radical initiator functional group (e.g., preferably not including the second vinyl crosslinking monomer), and the omniphobic compatibilizer is present in the thermoset omniphobic composition as a physical blend with the crosslinked reaction product between the third vinyl monomer and the fourth polyvinyl crosslinking monomer. In this refinement, upon UV curing, the PDMS or other omniphobic compatibilizer forms a physical blend with the cured polymer. There is no crosslinking of the omniphobic compatibilizer with the UV-cured polymer, since the omniphobic compatibilizer is a linear polymer with no free/pendant vinyl groups.

In an embodiment, the fourth polyvinyl crosslinking monomer is an ester reaction product between (i) an acrylic acid compound and (ii) a polyol. Suitable polyols can include polyether polyols, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, isosorbide, and combinations thereof. The acrylic acid compound can be represented by $CH_2=CR_1-C(=O)OH$, where $R_1$ can be as described above.

The relative amounts of the omniphobic compatibilizer, the third vinyl monomer, and the fourth polyvinyl crosslinking monomer are not particularly limited. In a refinement, the third vinyl monomer is present in the crosslinked polymerization reaction product in an amount in a range from 5 to 98 wt. % (or 80 to 90 wt. %, or 70 to 98 wt. %) based on the crosslinked polymerization reaction product; the omniphobic compatibilizer is present in the crosslinked polymerization reaction product in an amount in a range from 0.5 to 20 wt. % (or 1 to 10 wt. %) based on the crosslinked polymerization reaction product; and the fourth polyvinyl crosslinking monomer is present in the crosslinked polymerization reaction product in an amount in a range from 0.5 to 20 wt. % (or 1 to 10 wt. %) based on the crosslinked polymerization reaction product. For example, the third vinyl monomer can be present in an amount of at least 5, 10, 20, 30, 40, 50, 60, 70, 75, or 80 wt. % and/or up to 50, 60, 70, 75, 80, 85, or 90 wt. %. The omniphobic compatibilizer can be present in an amount of at least 0.5, 1, 1.5, 2, or 3 wt. % and/or up to 5, 8, 10, 15, 20, or 25 wt. %. The fourth polyvinyl crosslinking monomer can be present in an amount of at least 0.2, 0.5, 1, 2 or 4 wt. % and/or up to 5, 8, 10, 12, 15, or 20 wt. %. The foregoing ranges can be equivalently expressed on the basis of the thermoset omniphobic composition as a whole.

In some embodiments, the thermoset omniphobic composition is a crosslinked polymerization reaction product of a mixture including the omniphobic compatibilizer according to any of the variously disclosed embodiments including the second vinyl crosslinking monomer, a first thermosetting component having functional groups reactive with crosslinking groups of the second vinyl crosslinking monomer in the omniphobic compatibilizer, and a second thermosetting component having functional groups reactive with the first thermosetting component. For example, the second thermosetting component's reactive functional groups can be the same as the reactive functional groups in the second vinyl crosslinking monomer. The first and second thermosetting components can be conventional thermoset components, such as a polyisocyanate/polyol system (e.g., for a polyurethane) or an amine/polyepoxide system (e.g., for an epoxide resin). The reactive functional group in the second vinyl crosslinking monomer is suitably selected to be one of the same functional groups in the conventional thermoset components. No UV irradiation is required for curing. The end result is that the PDMS or other omniphobic compatibilizer is necessarily incorporated into the crosslinked thermoset network, regardless of whether it had pendant, linking, terminating, or backbone omniphobic chains. The crosslinked polymerization reaction product and corresponding thermoset omniphobic composition is generally formed via non-UV curing conditions (e.g., ambient temperature or elevated temperature curing conditions, with or without a non-UV catalyst) depend on the chemistry being used. For example, in the case of an epoxy-amine system, curing can be performed at room temperature or generally accelerated at higher temperature (e.g., 120° C.).

In an embodiment, the first thermosetting component and the second thermosetting component together correspond to a polyurethane. For example, the first thermosetting component can be a polyisocyanate or a polyol, the second thermosetting component can be the other of the polyisocyanate and the polyol (i.e., there is at least one polyisocyanate and at least one polyol). Further, the second vinyl crosslinking monomer includes at least one of an isocyanate group and a hydroxyl group for reaction with at least one of the first thermosetting component and the second thermosetting component.

The polyisocyanate is not particularly limited and generally can include any aromatic, alicyclic, and/or aliphatic isocyanates having at least two reactive isocyanate groups (—NCO). Suitable polyisocyanates contain on average 2-4 isocyanate groups. In some embodiments, the polyisocyanate includes a diisocyanate. In some embodiments, the polyisocyanate includes triisocyanate. Suitable diisocyanates can have the general structure (O=C=N)—R—(N=C=O), where R can include aromatic, alicyclic, and/or aliphatic groups, for example having at least 2, 4, 6, 8, 10 or 12 and/or up to 8, 12, 16, or 20 carbon atoms. Examples of specific polyisocyanates include 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diisocyanato-2,2,4-trimethyl-hexane, 1,6-diisocyanato-2,4,4-trimethyl-hexane, 1-iso-cyanatomethyl-3-isocyanato-1,5,5-trimethyl-cyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

The polyol is not particularly limited and generally can include any aromatic, alicyclic, and/or aliphatic polyols with at least two reactive hydroxyl/alcohol groups (—OH). Suitable polyol monomers contain on average 2-4 hydroxyl groups on aromatic, alicyclic, and/or aliphatic groups, for example having at least 4, 6, 8, 10 or 12 and/or up to 8, 12, 16, or 20 carbon atoms. In some embodiments, the polyol is a diol. In some embodiments, the polyol is a triol. Examples of specific polyols include one or more of polyether polyols (e.g., polypropylene oxide-based triols such as commercially available MULTRANOL 4011 with a MW of about 300), triethanolamine, hydroxlated (meth)acrylate oligomers (e.g., 2-hydroxylethyl methacrylate or 2-hydroxyethyl acrylate), glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth) acrylic polyols (e.g., having random, block, and/or alternating hydroxyl functionalities along with other (meth) acrylic moieties), and isosorbide. The polyol can be biobased or made of synthetic feedstock.

In some embodiments including a thermoset polyurethane polymer, at least one of the polyisocyanate and the polyol is a tri- or higher functional isocyanate or alcohol/hydroxy compound, respectively, to promote crosslinking of the backbone segments in the final thermoset polyurethane polymer.

In an embodiment, the first thermosetting component and the second thermosetting component together correspond to a thermoset epoxy. For example, the first thermosetting component can be a polyepoxide or an amine, and the second thermosetting component can be the other of the polyepoxide and the amine (i.e., there is at least one polyepoxide and at least one amine). Further, the second vinyl crosslinking monomer includes at least one of an epoxide group and an amino group for reaction with at least one of the first thermosetting component and the second thermosetting component.

The polyepoxide is not particularly limited and generally can include polyepoxide-substituted aromatic hydrocarbons, aliphatic hydrocarbons, cycloaliphatic hydrocarbons, ethers thereof, esters thereof, imines thereof, and combinations thereof. The polyepoxide can include hydrocarbons with two or more epoxide groups and one or more aromatic, aliphatic, cycloaliphatic, ether, ester, and/or imine groups in the hydrocarbon to which the epoxide groups are attached. Suitable polyepoxides can be derived from petroleum and plant materials. Suitable polyepoxides include two or more glycidyl ether groups (i.e., epoxide-containing groups). Some examples of polyepoxides include, but are not limited to, bisphenol A epoxy (e.g., diglycidyl ether of bisphenol A having 1 or 2-25 bisphenol A repeat units), bisphenol F epoxy (e.g., diglycidyl ether of bisphenol F having 1 or 2-25 bisphenol F repeat units), epoxy phenol novolac, epoxy cresol novolac, cycloaliphatic epoxies, halogenated epoxies, epoxy-vinyl esters, tetraglycidylmethylenedianiline (TGMDA), 3,4-epoxycyclohexylmethyl 3,4-epoxycyclohexanecarboxylate (ECC), bis[3,4-epoxycyclohexylmethyl] adipate (BECHMA), poly(glycidyl methacrylate), epoxies of rosin acid, epoxies of diphenolic acid, epoxies of tannin acid, epoxies derived from glucose, isosorbide epoxies, eugenol epoxides, furan epoxides, cathechin epoxides, vanillin-based epoxies, quercetin epoxides, epoxies derived from gallic acid, epoxies from phenols, epoxies from cardanols, epoxies from plant oils, terpene oxides (e.g., limonene dioxide), and combinations thereof.

The amine is not particularly limited and generally can include polyamine-substituted aromatic hydrocarbons, aliphatic hydrocarbons, cycloaliphatic hydrocarbons, ethers thereof, esters thereof, imines thereof, and combinations thereof. The amine can include hydrocarbons with two or more amino groups and one or more aromatic, aliphatic, cycloaliphatic, ether, ester, and/or imine groups in the hydrocarbon to which the amino groups are attached. Suitable amines can be derived either petrochemicals or plant materials. Some examples include, but are not limited to, isophorone diamine, diaminopropyl isosorbide, furfuryldiamine, polylysine, menthane diamine, tris (dimethylaminomethyl)phenol, melamine, bis(3-aminopropyl)amine, N,N'-bis(3-aminopropyl)-1,3-propanediamine, 3,3'-diamino-N-methyldipropylamine, tris (3-aminopropyl)amine, 1,2-bis(3-aminopropylamino) ethane, diethylenetriamine, polyetheramines (e.g., JEFFAMINE polyetheramines available from Huntsman Chemical). The amines can be primary, secondary or a combination of both.

In some embodiments including a thermoset epoxy polymer, at least one polyepoxide has a functionality greater than two or at least one amine has a functionality greater than one promote crosslinking of the backbone segments in the final epoxy polyurethane polymer. Specifically, since a single primary amino group can react with two epoxide groups, either some species with three or more epoxide groups or two or more amino groups (which can form four or more bonds with epoxides) are used for crosslinking. Typically a diepoxide and a diamine are used.

The relative amounts of the omniphobic compatibilizer, the first thermosetting component, and the second thermosetting component are not particularly limited. In a refinement, the omniphobic compatibilizer is present in the crosslinked polymerization reaction product in an amount in a range from 0.5 to 20 wt. % (or 1 to 10 wt. %) based on the crosslinked polymerization reaction product; the first thermosetting component is present in the crosslinked polymerization reaction product in an amount in a range from 5 to 90 wt. % (or 10 to 60 wt. %) based on the crosslinked polymerization reaction product; and the second thermosetting component is present in the crosslinked polymerization reaction product in an amount in a range from 5 to 90 wt. % (or 10 to 60 wt. %) based on the crosslinked polymerization reaction product. For example, the omniphobic compatibilizer can be present in an amount of at least 0.5, 1, 1.5, 2, or 3 wt. % and/or up to 5, 8, 10, 15, 20, or 25 wt. %. The first thermosetting component can be present in an amount of at least 5, 10, 20, 30, 40, 50, 60, or 70 wt. % and/or up to 40, 50, 60, 70, 80, or 90 wt. %. The second thermosetting component can be present in an amount of at least 5, 10, 20, 30, 40, 50, 60, or 70 wt. % and/or up to 40, 50, 60, 70, 80, or 90 wt. %. The foregoing ranges can be equivalently expressed on the basis of the thermoset omniphobic composition as a whole.

In an embodiment, the thermoset omniphobic composition can include any suitable organic or inorganic filler or additive, which can be included to improve one or more of mechanical properties, optical properties, electrical properties, and omniphobic properties of the final composition. Examples of suitable fillers or additives include nanoclay, graphene oxide, graphene, carbon fiber, silsesquioxane, silicon dioxide (silica), aluminum oxide, diatomaceous earth, cellulose nanocrystals, carbon nanotubes, titanium dioxide (titania), and combinations or mixtures thereof. In addition, the fillers can include biocides, pigments, dyes, a thermoplastic material, or a combination thereof. The fillers can be added in the range from 0.01 wt. % to 10 wt. % or 0.01 wt. % to 50 wt. %, for example in range from 1 wt. % to 5 wt. % or 1 wt. % to 20 wt. %.

The omniphobic properties of the thermoset composition (e.g., for the cured composition) can be characterized in terms of one or more contact angles and/or sliding angles for water and/or oil droplets (e.g., vegetable oil and/or hexadecane) on the thermoset composition (e.g., as a coating on a substrate). The following ranges are representative of compositions according to the disclosure which display favorable omniphobic properties. In an embodiment, the composition has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the composition has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the composition has an oil sliding angle in a range from 0° or 1° to 20° for a 25 µl droplet (e.g., at least 1°, 2°, 4°, 6°, or 8° and/or up to 10°, 12°, 15°, or 20°; such as for the cured composition as a coating). The contact angles for the omniphobic coatings can be higher when nanofillers (e.g., clay, silica, etc.) are included in the composition as compared to corresponding compositions without any nanofillers.

The thermoset omniphobic composition generally has a homogeneous structure. For example, the thermoset omniphobic composition can be a homogenous thermoset solid with backbone segments corresponding to the omniphobic compatibilizer, the third vinyl monomer, and the fourth polyvinyl crosslinking monomer being generally evenly distributed throughout the composition. Similarly, the thermoset omniphobic composition can be a homogenous thermoset solid with backbone segments corresponding to the omniphobic compatibilizer, the first thermosetting component, and the second thermosetting component being generally evenly distributed throughout the composition.

Coated Article

Figure 3:
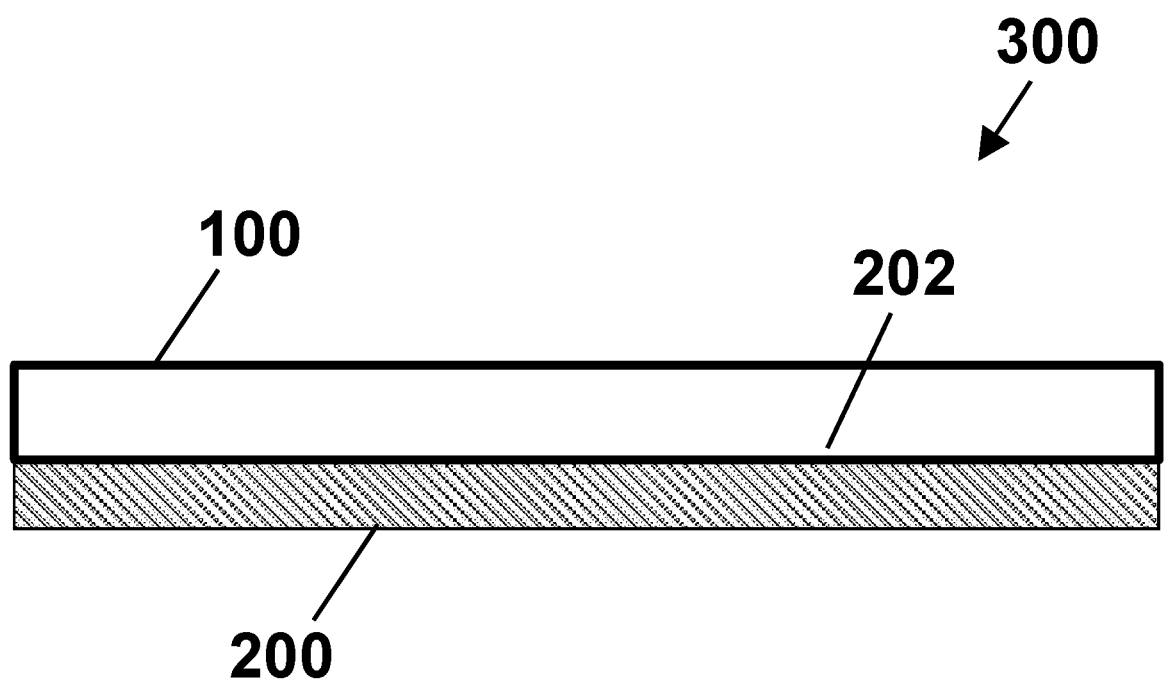
FIG. 3 illustrates a coated article, including a thermoset omniphobic composition coating according to the disclosure.

FIG. 3 illustrates an aspect of the disclosure in which a coated article 300 (e.g., desirably having omniphobic properties on at least one surface thereof) includes a substrate 200 and the thermoset omniphobic composition 100 coated on a surface 202 of the substrate 200. The composition 100 can be in the form of a coating or film on an external, environment-facing surface 202 of the substrate 200 (e.g., where the surface 202 would otherwise be exposed to the external environment in the absence of the composition 100). In this case, the thermoset omniphobic composition 100 provides omniphobic protection to the underlying substrate 200.

The substrate 200 is not particularly limited, and generally can be formed from any material desired for protection with an omniphobic coating, in particular given the good, broad adhesive capabilities of the thermoset omniphobic composition 100. For example, the substrate can be a metal, plastic, a different thermoset material (e.g., a primer material; material other than the other than thermoset omniphobic composition), glass, wood, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), starch, chitosan, etc. Suitable wood materials can be any type of wood commonly used in home, office, and outdoor settings. Suitable glass materials can be those used for building windows, automobile windows, etc. In some embodiments, the substrate 200 is a top layer of a coating or series of coatings on a different underlying substrate. For example, the coated article can include a substrate 200 material as generally disclosed herein, one or more intermediate coatings on the substrate 200 (e.g., an epoxy coating, an acrylic coating, another primer coating, etc.), and the thermoset omniphobic composition 100 on the one or more intermediate coatings as the final, external coating on the coated article 300.

The thermoset omniphobic composition 100 can have any desired thickness on the substrate 200. In common applications, the composition 100 has a thickness ranging from 0.010 µm to 500 µm, for example at least 0.01, 10, 20, 50, or 100 µm and/or up to 200, 500 µm. Typical cast coatings can have thicknesses of 10 µm to 100 µm. Typical spin coatings can have thicknesses of 0.05 µm or 0.10 µm to 0.20 µm or 0.50 µm. Multiple coating layers can be applied to substrate 200 to form even thicker layers of the composition 100 (e.g., above 500 µm or otherwise) if desired.

Method of Making Compositions and Coated Article

The polymerization reaction product and corresponding omniphobic compatibilizer are generally formed via suitable vinyl polymerization conditions for the first vinyl monomer, the second vinyl crosslinking monomer (when present), and the functionalized omniphobic polymer. For example, polymerization can be performed in the presence of a suitable free-radical initiator having an azo-linkage (e.g., azobisisobutyonitrile (AIBN)), an inorganic peroxide (e.g., ammonium persulfate), an organic peroxide (e.g., cumene hydroperoxide), or a photoinitiator (e.g., benzophenone). The reaction conditions for the free-radical polymerization are dependent on the nature of the free-radical initiator. In embodiments where the functionalized omniphobic polymer serves as a macroinitator (i.e., based on its free radical initiator functional group), a separate free-radical initiator is not required. For example, the polymerization of an azo group-containing functionalized omniphobic polymer can be performed in toluene at 65° C. for 8 h, but other reaction solvents, times, and temperatures can be used as desired. If a peroxide- or a persulfate-functionalized omniphobic polymer system is used, free radicals under mild conditions can be generated by one-electron transfer reactions, for example via redox initiation. In addition to free radical polymerization, controlled radical polymerization (CRP) (e.g., ATRP and modified ATRP systems such as reverse ATRP, NMP, RAFT, temporal CRP) can be used to form the omniphobic compatibilizer, where a free-radical initiator may or may not be required. The omniphobic compatibilizer can also be prepared via a non-free radical mode of polymerization such as anionic, cationic and coordination polymerization. Any desired reaction solvent or medium can be used, for example an aprotic organic solvent, a protic organic solvent, any other suitable solvent, or even a solvent-free system (e.g., bulk polymerization). Examples of aprotic organic solvents include acetone, dichloromethane, tetrahydrofuran, 2-butanone, esters (e.g., methyl, ethyl, n-propyl, butyl esters of acetic acid such as n-butyl acetate, etc.), dimethylformamide, dimethyl carbonate, etc. Examples of protic organic solvents include methanol, ethanol, propanol, isopropanol, etc.

The thermoset omniphobic composition according to the disclosure generally can be formed by mixing or otherwise combining the omniphobic compatibilizer and its further monomer(s) or polymerization component(s), for example (i) the third vinyl monomer, the fourth polyvinyl crosslinking monomer, and the UV-curing catalyst, or (ii) the first thermosetting component and the second thermosetting component. The mixture is then curing to form the thermoset omniphobic composition, for example after application to a substrate to provide an omniphobic coating thereon. In some embodiments, the mixture can be pre-reacted to form a partially crosslinked reaction product before application to a substrate, whereupon final curing and crosslinking occurs on the substrate. The partially crosslinked reaction product contains at least some unreacted functional groups for eventual further reaction during curing/full crosslinking. In some embodiments, the mixture is applied to the substrate prior to reaction, and curing is effected while the composition components are on the substrate. Reaction and/or application of the thermoset omniphobic composition components can be performed in a suitable reaction or casting solvent or medium, for example an aprotic organic solvent such as acetone, tetrahydrofuran, 2-butanone, esters e.g., methyl, ethyl, n-propyl, butyl esters of acetic acid such as n-butyl acetate, etc.), dimethylformamide, dimethyl carbonate, diethyl carbonate, dimethylformamide, dimethylacetamide, acetonitrile, etc. In some embodiments, a reaction catalyst such as salts of tin (e.g., tin(II) 2-ethylhexanoate) or iron, and tertiary amines (e.g., triethylamine) can be used. The thermoset omniphobic composition components, with our without a solvent, can be applied to the substrate using any suitable method, such as by casting, spraying, rolling and/or dipping. When solvent is present, a drying step prior to curing can be used to remove the solvent from the substrate. Curing can be performed by heating (e.g., in an oven, with exposure to a heat lamp, etc.) at a temperature from 80° C. or 100° C. to 140° C. or 180° C. and/or for a time from 1 hr to 24 hr. Lower heating temperature or ambient temperature curing also possible, such as room temperature curing (e.g., 20° C. to 30° C.) for 5-10 days, lower heating (e.g., 30° C. or 40° C. to 60° C. for 2-4 days or 60° C. to 80° C. for 1-3 days).

EXAMPLES

The following examples illustrate the disclosed compositions and methods, but are not intended to limit the scope of any claims thereto. In the following examples, omniphobic compatibilizers and corresponding thermoset omniphobic compositions generally according to the disclosure are prepared and applied as a film or coating on a test substrate such as glass. The applied films or coatings can then be evaluated according to a variety of tests as described below in order to characterize their relative degree of omniphobicity.

Contact Angle: Contact angles (see FIG. 1) are determined by applying a liquid droplet on a test coating surface that is stationary and horizontal with respect to gravity. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a volume of about 5 µl (e.g., about 3 µl to 10 µl), although the measured contact angle is not particularly sensitive to actual droplet volume in these ranges. Once applied to the test coating, the droplet can be visually interrogated through any suitable means to determine the contact angle (e.g., using conventional digital image photography and digital image analysis). Suitably, (cured) omniphobic composition coatings according to the disclosure have a water contact angle in a range from 90° to 120° (e.g., at least 90°, 95°, 100°, or 105° and/or up to 110°, 115°, or 120°). Suitably, (cured) omniphobic composition coatings according to the disclosure have an oil contact angle in a range from 10° to 65° (e.g., at least 10°, 20°, or 30° and/or up to 40°, 50°, 60°, or 65°).

Sliding Angle: Sliding angles are determined by applying a liquid droplet on a test coating surface that is initially horizontal with respect to gravity. The test coating surface is then gradually ramped at a controlled/known angle relative to the horizontal plane. Droplets which do not initially spread will remain stationary on the test surface until the test surface is ramped to a sufficiently high angle to cause the droplets to slide down the ramped test surface. The test surface angle at which sliding begins is the sliding angle of the test coating. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a specified volume, which is generally about 75 µl (e.g., about 50 µl to 150 µl) for water and about 20 µl (e.g., about 5 µl to 40 µl) for oil. Once applied to the test coating, the droplet can be visually interrogated through any suitable means to determine the sliding angle (e.g., using conventional digital image photography and digital image analysis). Suitably, (cured) omniphobic composition coatings according to the disclosure have a water sliding angle in a range from 0° or 1° to 30° (e.g., at least 1°, 2°, 4°, 6°, or 8° and/or up to 10°, 15°, 20°, or 30°). Suitably, (cured) omniphobic composition coatings according to the disclosure have an oil contact angle in a range from 0° or 1° to 20° (e.g., at least 1°, 2°, 4°, 6°, or 8° and/or up to 10°, 12°, 15°, or 20°).

Scratch Resistance: Scratch resistance is evaluated on a scale of 1 (worst) to 10 (best) by attempting to scratch a test coating surface using materials of various hardness, such as a human fingernail, the corner/edge of a glass slide, a metal (e.g., stainless steel) knife, etc. The test surface is rated as "1" for a given scratching material if there is substantial damage or delamination of the test coating surface after being scratched. The test surface is rated as "10" for a given scratching material if there is no observable damage or marking on the test coating surface after being scratched. These qualitative numbers were obtained based on the criteria including: 1) the depth of the scratch, 2) is scratch damaging the surface, and 3) whether the scratch be felt if touched by hand.

Permanent Ink Resistance: Permanent ink resistance is evaluated on a scale of 1 (worst) to 10 (best) by applying an ink marking on a test coating surface using a permanent ink marker (e.g., SHARPIE permanent ink marker or equivalent) and then attempting to wipe off the marking using a tissue (e.g., KIMWIPE laboratory cleaning tissue or equivalent). The test surface is rated as "1" if all of the ink marking remains on the test coating surface after being wiped. The test surface is rated as "10" if all of the ink marking is removed from the test coating surface after being wiped. These numbers give an estimation of the ink-resistance, which are qualitatively assigned by taking two aspects in consideration: 1) the amount of ink left behind after a single wipe of the sample, and 2) the ink left behind after multiple wipes of the sample.

Example 1—Synthesis of PDMS-Based Vinyl Omniphobic Compatibilizers

Omniphobic compatibilizers according to the disclosure were synthesized and then incorporated into a thermoset omniphobic compositions as described below.

Compatibilizer 1: A polymerization reaction product between a vinyl monomer and a di-vinyl functionalized omniphobic polymer was formed as follows. 0.5 ml of tetrahydrofurfuryl acrylate (THF monomer) was charged in 20 ml glass vial along with 2.5 ml of tetrhydrofuan (THF)

solvent and 0.02 mg of azobisisobutyronitrile (AIBN) initiator. This mixture was purged with nitrogen and was kept on magnetic stirring hot plate. After 5 minutes of stirring, a nitrogen-purged mixture of 1.5 ml of THF monomer, 0.5 ml of difunctional methylmethacryl-functionalized PDMS along with 0.04 mg of AIBN initiator in 3 ml of THF solvent was dropped continuously with automatic micro-injection pump at flow rate of 2.5 ml/hr. After this addition, polymer backbone was end-capped with THF monomer by adding mixture of 0.3 ml THF solvent and 0.1 ml of THF monomer.

Compatibilizer 2: A polymerization reaction product between a vinyl monomer and a di-vinyl functionalized omniphobic polymer was formed as follows. 0.2 g of tetrahydrofurfuryl Acrylate (THF monomer), 0.2 g of azobisisobutyronitrile (AIBN) and 2 mL of Tetrahydrofuran (THF solvent) were placed in a 20 mL vial containing a magnetic stir bar and capped with a rubber septum. The contents were purged with nitrogen gas for 10 minutes. The vial was placed in a heating block at a temperature of 65° C. The reactants were allowed to react for 4 minutes. Another solution containing 1.8 g THF monomer, 0.4 g AIBN, 3.85 mL THF solvent and 0.75 g of difunctional methylmethacrylate-functionalized PDMS were placed in a 5 mL syringe fitted with a 6 inch long stainless steel syringe needle. The contents of the syringe were pumped into the vial at the rate of 2.5 mL/hour over a period of 2 hours. Thereafter, a solution containing 0.05 g THF monomer, 0.15 mL THF solvent and 0.01 g of AIBN were injected into the 20 mL vial to end-cap the final polymer solution.

Thermoset Omniphobic Composition: A thermoset omniphobic composition was formed as a UV-cured reaction product between the above compatibilizers, an additional vinyl monomer, and a polyvinyl crosslinking monomer. The compositions included (i) 1 g of either Compatibilizer 1 or Compatibilizer 2, (ii) 3 g of THF monomer (i.e., same vinyl monomer used to form the compatibilizers), (iii) 1 g of NANOCRYL C130 (50 wt.-%20 nm nanosilica particles in cyclic trimethylolpropaneformalacrylate (CTFA) as crosslinker; available from Evonik), (iv) 0.05 g of GENOCURE DMHA (aromatic ketone photoinitiator for UV curing; available from Rahn). The compositions were crosslinked/cured by UV radiation to form the corresponding thermosets, and no precipitation of the compatibilizers was observed. Subsequent NMR analysis of the reaction product confirmed that the vinyl functional groups in the compatibilizer, the vinyl monomer, and the polyvinyl crosslinking monomer were consumed and incorporated into corresponding monomer-compatibilizer bonds in the resulting polymer.

Example 2—Synthesis of PDMS-Based Free Radical Omniphobic Compatibilizers

Omniphobic compatibilizers according to the disclosure were synthesized and then incorporated into a thermoset omniphobic compositions as described below. This approach is based on the synthesis of copolymers using PDMS as macroinitiator. This PDMS macroinitiator was then polymerized with other comonomers to form PDMS copolymers which can serve as an omniphobic compatibilizer. For example, for incorporation into an epoxy thermoset system, PDMS is copolymerized with a glycidyl methacrylate to form the omniphobic compatibilizer. For incorporation into a urethane thermoset system, PDMS is copolymerized with a hydroxy-functional methacrylate (e.g., 3-hydroxypropyl methacrylate (HEMA)). These omniphobic compatibilizer copolymers were added into urethane, epoxy, and UV curable coatings to obtain clear omniphobic coatings. These coatings are readily applicable to metal, glass, wood, plastics and fabrics. The obtained coatings are durable due to the cross-linked coating matrix and are optically clear even at thicknesses up to several hundred microns (e.g., up to 100, 200, 300, or 400 µm). These films or coatings can be used in water-, oil-, anti-fingerprint and antigraffiti paints. These films or coatings can be loaded with nanofillers such as cellulose nanocrystals (CNC), graphene oxide, nanoclay, or silica particles as well to obtain self-cleaning composites films.

Figure 4:
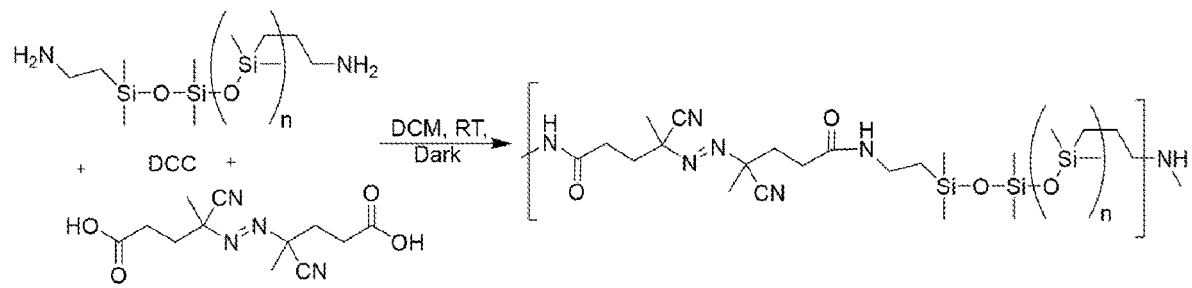
FIG. 4 illustrates a synthetic scheme for forming a functionalized omniphobic polymer having a free radical initiator functional group according to an embodiment of the disclosure.

Macroinitiator: A macroinitiator corresponding to a functionalized omniphobic polymer having a free radical initiator functional group was formed as follows. To a solution of di-amino functional PDMS (9.0 g, 3.0 mmol, Mw=3000 g/mol; available from Gelest) in dichloromethane (DCM) (35 ml), 4,4'-Azobis(4-Cyanovaleric Acid) (883 mg, 3.3 mmol, 1.05 eq) was added at 0° C. In the combined solution N,N'-dicyclohexylcarbodiimide (DCC) (680 mg, 3.87 mmol, 1.1 eq) was added at the same temperature. The reaction mixture was stirred at room temp in the dark for 24 h. White precipitate appeared, and the reaction mixture was poured into 100 ml methanol and centrifuged over 15 minutes. The bottom layer was separated and denoted as DMSA-ACVA (or PDMS macroinitiator). The synthesis and structure of the PDMS macroinitiator are shown in FIG. 4.

Figure 5:
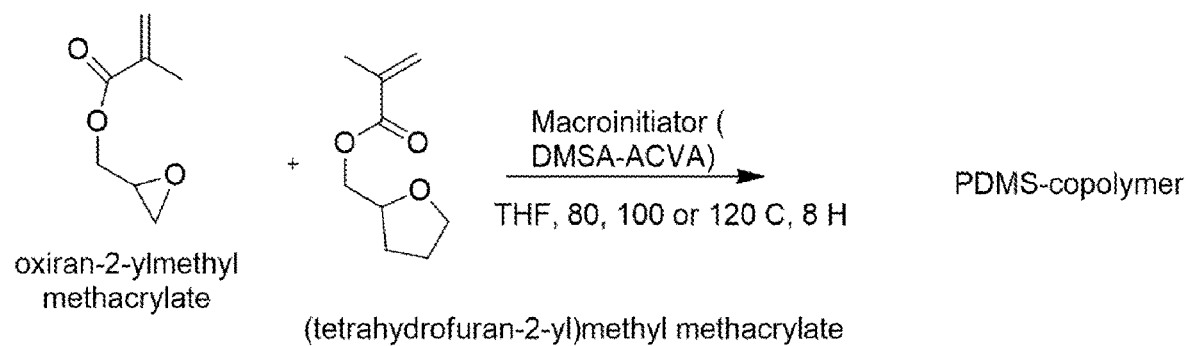
FIG. 5 illustrates a synthetic scheme for forming an omniphobic compatibilizer according to an embodiment of the disclosure.

Compatibilizer 1: A polymerization reaction product between an epoxy-functional vinyl monomer, a vinyl crosslinking monomer, and a free-radical-initiator functionalized omniphobic polymer was formed as follows. 500 mg of the DMSA-ACVA PDMS macroinitiator polymer was added to a mixture of oxiran-2-ylmethyl methacrylate (denoted OMM or GMA) (185 mg, 20 mol % of eq) and (tetrahydrofuran-2-yl)methyl methacrylate (denoted MMA or THFA) (821 mg, 80 mol % of eq) in THF (3 ml). After 8 h at temperatures of 80, 100, or 120° C., the solution became two separate layers. NMR analysis confirmed that both layers contained the polymerization reaction product, but most product was in the top layer. After separating the layers, remaining solvent was evaporated and the yield was 800 mg. The synthesis of Compatibilizer 1 is shown in FIG. 5.

Figure 6:
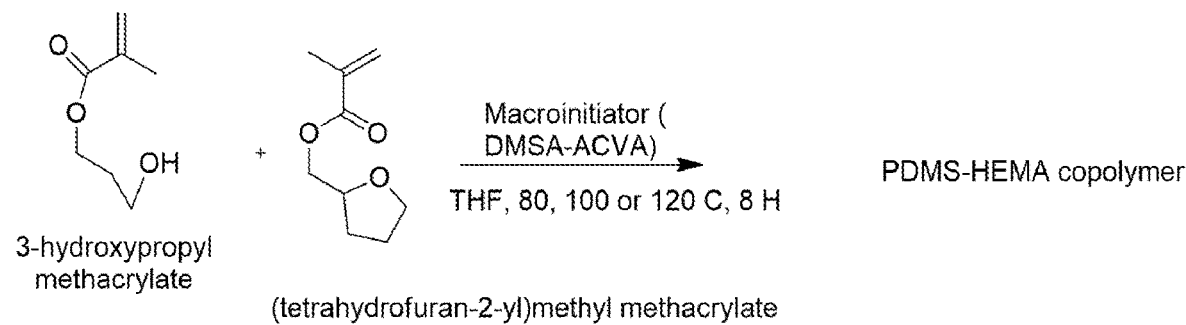
FIG. 6 illustrates a synthetic scheme for forming an omniphobic compatibilizer according to another embodiment of the disclosure.

Compatibilizer 2: A polymerization reaction product between a hydroxy-functional vinyl monomer, a vinyl crosslinking monomer, and a free-radical-initiator functionalized omniphobic polymer can be formed as follows. The same process as for Compatibilizer 1 can be used, but the epoxy-functional vinyl monomer (i.e., oxiran-2-ylmethyl methacrylate) is replaced with a hydroxy-functional vinyl monomer such as 3-hydroxypropyl methacrylate (HEMA)). The synthesis of Compatibilizer 2 is shown in FIG. 6. Compatibilizer 2 can be used to form a corresponding thermoset omniphobic polyurethane (e.g., a self-cleaning urethane) by reaction with an isocyanato-functional thermosetting component (e.g., polyisocyanate), and a hydroxy-functional thermosetting component (e.g., polyol).

Thermoset Omniphobic Composition: A thermoset omniphobic composition was formed as a UV-cured reaction product between the above Compatibilizer 1, an epoxy-functional thermosetting component, and an amino-functional thermosetting component. 1 g of bisphenol A (BPA) epoxy resin (EPON 826, EEQ=180; available from Miller-Stephenson) were dissolved in 1 ml of toluene solvent, and then 132 mg (2 wt % of coating) of Compatibilizer 1 was added and vortexed efficiently. An equivalent amount of amine hardener (poly(propylene glycol) bis(2-aminopropyl ether), Mn~230) was added and mixed. The mixture was cast onto glass slides and kept in oven for curing at 80° C.

(Sample 1) or 120° C. (Sample 2) for 1 hour. The samples were tested for water (50 μL) repellency, oil repellency, hexadecane repellency, clarity, and durability. The results are shown in Table 1 below, and the results were rated on a scale of 1 (worst) to 5 (best).

TABLE 1

Omniphobic Properties for Coatings of Example 2

| Sample | Compatibilizer Composition | | | Layer | Water (50 μL) Repellency | Oil Repellency | Hexadecane Repellency | Clarity | Durability |
| | Macro Initiator (wt %) | THFA (mol %) | GMA (mol %) | | | | | | |
|---|---|---|---|---|---|---|---|---|---|
| 1 | 33% | 80% | 20% | Top | 4-5 | 5 | 5 | 2 | 5 |
|   |     |     |     | Bottom | 5 | 5 | 5 | 5 | 5 |
| 2 | 33% | 80% | 20% | Top | 4-5 | 5 | 5 | 4 | 5 |
|   |     |     |     | Bottom | 5 | 5 | 5 | 5 | 5 |

Example 3—Self-Cleaning Epoxy Coatings

This example illustrates the synthesis of a self-cleaning epoxy using an omniphobic compatibilizer prepared by free radical polymerization of PDMS-dimethacrylates and vinyl monomers Materials: Toluene (Sigma Aldrich), 2,2'-Azobis(2-methylpropionitrile) (Sigma Aldrich) monomethacryloxypropyl terminated polydimethylsiloxane asymmetric (Mn=5000 & 10000 g/mol, Gelest. INC), methacryloxypropyl terminated polydimethylsiloxane (Mn=5000 & 10000 g/mol, Gelest. INC), methylmethacrylate (Signam Aldrich), glycidyl methacrylate (Sigma Aldrich), poly(propylene glycol) bis(2-aminopropyl ether) (JEFFAMINE, Mn~230, Sigma Aldrich) and diglycidyl ether of bisphenol A (DGEBA) epoxy resin (EPON 826, EEW~180; available from Miller-Stephenson) were purchased and used without further purification.

Compatibilizer: Polydimethylsiloxane (PDMS) based monomer (divinyl), methylmethacrylate (MMA), glycidyl methacrylate (GMA), tetrahydrofuran solvent (THF) (four times of monomers) and 2,2'-Azobis(2-methylpropionitrile) (AIBN) (2-3 wt %) were charged in a high pressure glass reaction flask under nitrogen atmosphere in gloves box. Tetrahydrofuran solvent was already purged with nitrogen gas in order to free it from entrapped oxygen. The reaction flask was kept under stirring overnight on hot plate at 70° C. Reaction conversion was assured by characterizing sample from reaction mixture by proton nuclear magnetic resonance ($^1$H-NMR) spectroscopy. After completion of reaction, the product was concentrated from THF solvent by rotary evaporator. Table 2 presents the sample code designation of omniphobic compatibilizers (or "additives") and description of their corresponding composition.

TABLE 2

Sample Code Designation and Description for Example 3

PDMS to Vinyl monomers ratio (wt %) = 40:60

| | | | Vinyl Monomers | |
|---|---|---|---|---|
| Serial No. | Sample Code | PDMS Monomer (wt %) | MMA (mol %) | GMA (mol %) |
| Additive - methacryloxypropyl PDMS 10K(DIVINYL) | | | | |
| 1 | 2X-10K | 40 | 80 | 20 |
| 2 | 4X-10K | 40 | 60 | 40 |
| Additive - methacryloxypropyl PDMS 5K (DIVINYL) | | | | |
| 3 | 2X-5K | 40 | 80 | 20 |
| 4 | 4X-5K | 40 | 60 | 40 |
| Additive - monoMethacryloxypropyl PDMS 10K (MONOVINYL) | | | | |
| 5 | 2Y-10K | 40 | 80 | 20 |
| 6 | 4Y-10K | 40 | 60 | 40 |
| Additive - monoMethacryloxypropyl PDMS 5K(MONOVINYL) | | | | |
| 7 | 2Y-5K | 40 | 80 | 20 |
| 8 | 4Y-5K | 40 | 60 | 40 |

Thermoset Omniphobic Composition: About 1.0 g of epoxy resin was diluted with 1 ml of toluene. An equivalent amount of JEFFAMINE-D230 hardener was mixed in it homogeneously. A varying amount (1, 2, 4 and 8 wt % siloxane) of prepared additive was added into epoxy-hardener mixture and thoroughly mixed under vertex. The epoxy mixture was then casted on to glass slides (1 cm×4 cm) and placed in vacuum oven for degassing. The casted glass slides were cured at 100° C. for 1 h and then post-cured at 120° C. for 1 h further.

Spectroscopic Analysis: The monomers and prepared siloxane additives were analyzed by Fourier-transform infrared (FTIR) and Nuclear magnetic resonance (NMR) spectroscopic techniques. FTIR spectra were recorded by Shimadzu IR PRESTIGE21 FTIR spectrophotometer (Shimadzu Co., Columbia, Md.) equipped with attenuated total reflection attachment (PIKE Technologies, Madison, Wis.). The spectral range of 4000-400 cm$^{-1}$ with total number of 64 scans with resolution of 4 cm$^{-1}$ was recorded for each sample. This FTIR study was aimed to confirm the synthesized additive. Agilent DIRECTDRIVE2 500 MHz NMR spectrometer (Agilent Technologies, Palo Alto, Calif., USA) was employed to record $^1$H-NMR spectra of prepared additives at ambient temperature. $CDCl_3$ solvent was used to prepare sample by dissolving additives into it.

Water contact angle and hysteresis: Water contact angles (WCAs) were measured using a 590-U1 Advanced Automated Goniometer with DROPIMAGE Advanced software (Ramé-hart Instrument Co., N.J.). A deionized water droplet (10 μL) was placed onto the sample surface and then recorded. The contact angle was measured at three different places on surface of each sample and averaged. The water contact angle hysteresis values were measured from difference of receding angle ($Ø_R$) and advancing angle ($Ø_A$) according to Equation 1: Contact Angle Hysteresis=cos($Ø_R$)−cos($Ø_A$) (1). The advancing and receding angles were recorded via droplet tilt method on surface of prepared coatings while dynamically measuring the contact angles at both sides of tilted droplet.

The contact angles and hysteresis of water, oil and hexadecane were recorded and results as shown in Table 3 and 4. The DGEBA based epoxy resin cured with jeffamine hardener showed highly hydrophilic surface with water contact angle of 350 UV. Water droplet sticked on its surface very firmly and couldn't able to slide on tilting. Others liquids such as vegetable oil and hexadecane revealed a similar behavior. However, the incorporation of prepared additives in epoxy matrix showed a significant enhancement in repellent properties towards these liquids. All coatings demonstrated almost similar water contact angles in range between 99–105°, Beside this, no significant variation was seen in contact angles of oil and hexadecane for bifunction methacryloxypropyl based PDMS (X series). In comparison, control (MONOVINYL) showed slightly lower contact angles for water and oil and bad repellency against hexadecane. Hexadecane droplet spread over coating surface and leaved its residues on tilting.

TABLE 3

Contact angles for water and oil and hexadecane

| Wt % | Water Contact Angle | | | | Oil Contact Angle | | | | Hexadecane Contact Angle | | | |
|---|---|---|---|---|---|---|---|---|---|---|---|---|
| Additives - methacryloxypropyl based PDMS (DIVINYL) | | | | | | | | | | | | |
| | 2X-10k | 4X-10k | 2X-5k | 4X-5k | 2X-10k | 4X-10k | 2X-5k | 4X-5k | 2X-10k | 4X-10k | 2X-5k | 4X-5k |
| 1 | 101.2 | 98.5 | 100.8 | 101.2 | 55.8 | 54.5 | 56.2 | 55.5 | 18.5 | 17.4 | 18.8 | 18.3 |
| 2 | 101.4 | 102.4 | 99.8 | 100 | 54.1 | 57.1 | 56.9 | 56.2 | 17.8 | 16.5 | 17.7 | 17.8 |
| 4 | 105.2 | 100.7 | 102.8 | 100.7 | 55.7 | 55.2 | 55.5 | 56.9 | 17 | 17.1 | 19.4 | 18.5 |
| 8 | 99 | 102.6 | 100.2 | 103.4 | 56.9 | 56.6 | 54.7 | 55.1 | 16.1 | 17.5 | 19.3 | 18.6 |
| Additives - monoMethacryloxypropyl based PDMS (DIVINYL) | | | | | | | | | | | | |
| | 2Y-10k | 4Y-10k | 2Y-5k | 4Y-5k | 2Y-10k | 4Y-10k | 2Y-5k | 4Y-5k | 2Y-10k | 4Y-10k | 2Y-5k | 4Y-5k |
| 1 | 96.6 | 102.5 | 97 | 99.6 | 52.5 | 53.2 | 53.9 | 53.3 | — | — | — | — |
| 2 | 98.6 | 101.2 | 100.9 | 99.6 | 51.8 | 52.4 | 53.8 | 53.4 | — | — | — | — |
| 4 | 100.3 | 102.3 | 101.9 | 97.8 | 52.2 | 52.3 | 53.9 | 54.3 | — | — | — | — |
| 8 | 98.2 | 102.9 | 99.3 | 103.3 | 52.2 | 53 | 55.2 | 52.7 | — | — | — | — |

TABLE 4

Contact angle hysteresis for water oil and hexadecane

| Wt % | WCA Hysteresis | | | | OCA Hysteresis | | | | HCA Hysteresis | | | |
|---|---|---|---|---|---|---|---|---|---|---|---|---|
| Additives - methacryloxypropyl based PDMS | | | | | | | | | | | | |
| | 2X-10k | 4X-10k | 2X-5k | 4X-5k | 2X-10k | 4X-10k | 2X-5k | 4X-5k | 2X-10k | 4X-10k | 2X-5k | 4X-5k |
| 1 | 0.45714 | 0.38699 | 0.30875 | 0.33917 | 0.08759 | 0.08342 | 0.06741 | 0.04866 | 0.01382 | 0.01565 | 0.01207 | 0.01056 |
| 2 | 0.37643 | 0.36118 | 0.27905 | 0.24622 | 0.06926 | 0.04076 | 0.06521 | 0.05731 | 0.01235 | 0.01632 | 0.01173 | 0.01186 |
| 4 | 0.40478 | 0.45238 | 0.23419 | 0.26057 | 0.07007 | 0.07290 | 0.07553 | 0.06799 | 0.01682 | 0.01334 | 0.01347 | 0.01100 |
| 8 | 0.37964 | 0.39514 | 0.27103 | 0.27394 | 0.07133 | 0.09213 | 0.06287 | 0.05996 | 0.01140 | 0.01450 | 0.01086 | 0.00584 |
| Additives - monoMethacryloxypropyl based PDMS | | | | | | | | | | | | |
| | 2Y-10k | 4Y-10k | 2Y-5k | 4Y-5k | 2Y-10k | 4Y-10k | 2Y-5k | 4Y-5k | 2Y-10k | 4Y-10k | 2Y-5k | 4Y-5k |
| 1 | 0.75656 | 0.34819 | 0.68524 | 0.66583 | 0.072749 | 0.027355 | 0.09165 | 0.01379 | — | — | — | — |
| 2 | 0.64172 | 0.29411 | 0.60425 | 0.28624 | 0.06762 | 0.029584 | 0.09742 | 0.06107 | — | — | — | — |
| 4 | 0.60379 | 0.31076 | 0.56126 | 0.26481 | 0.0764 | 0.027912 | 0.09137 | 0.04950 | — | — | — | — |
| 8 | 0.55964 | 0.43071 | 0.58041 | 0.26339 | 0.066139 | 0.030289 | 0.10505 | 0.02307 | — | — | — | — |

Contact angle hysteresis is an important physical parameter that provides additional information about surface topography or roughness in addition to static contact angle. It reveals how much extent a liquid droplet sits on a contact surface and its ability to roll over it. It is the difference of advancing and receding angles. Lesser the value of contact angle hysteresis reflects greater the surface is slippery and lesser the droplet deformation on sliding. The contact angles hysteresis for water, oil, and hexadecane were decreased as increase in siloxane contents in the coating composition. It is interesting that series 4X showed comparatively lesser hysteresis values as compared to its comparative series 2X. It is possibly due to having greater oxirane contents in 4X series additives which chemically cure with epoxy resin and reduces their phase separation. The control did not show hysteresis values as hexadecane spread over their surfaces. Among all series, 4X-5k with 2% siloxane contents showed least hysteresis values which reveals its best ability to roll off the water, oil and hexadecane droplets.

Sliding contact angle: The sliding angles of water droplets were recorded by sliding angle measurement instrument. A droplet size of 80 μL of deionized water was taken for sliding angle measurements. The water was placed on a horizontal coated surface and tilted gradually until the droplet (both receding and advancing contact lines) began to slide. The sliding angles were taken from three different points on each sample and averaged.

The more accurate sliding angle measurement apparatus was employed for sliding angles measurement and reported in Table 5 for water, oil and hexadecane liquids. The sliding angles decreased with increase in siloxane contents in coatings for each particular series up to 8% siloxane loading in coating formulation. These results are best agreed with contact angle hysteresis findings. The 4X series showed comparatively lower sliding angles from 2X series and series 4X-5K showed least sliding angles. Its 2% siloxane weight loading in coating exhibited 11° of sliding angles for 25 uL water droplet while 5° and 1.5° were recorded for oil and hexadecane sliding for 10 μL droplets. The control coatings (data not shown) had poor hexadecane repellency and comparatively higher water contact angle hysteresis.

The percentage transmittances of all coatings are reported in Table 6. The PDMS divinyl system showed superior performance over the PDMS monovinyl system.

TABLE 6

Optical transmittance

| Wt % | Water Sliding Angle | | |
|---|---|---|---|
| Additives - methacryloxypropyl based PDMS | | | |
| | 4X-10k | 2X-5k | 4X-5k |
| 1 | 99.17 | 97.2 | 99.28 |
| 2 | 98.87 | 89.9 | 99.22 |
| 4 | 99.01 | 93.8 | 98.72 |
| 8 | 98.44 | 93.7 | 97.4 |
| Additives - monoMethacryloxypropyl based PDMS | | | |
| | 4Y-10k | 2Y-5k | 4Y-5k |
| 1 | 99.6 | 72.8 | 98.8 |
| 2 | 98.3 | 42.2 | 97.8 |
| 4 | 97.5 | 25.9 | 97.6 |
| 8 | 97.8 | 25 | 97.9 |

Self-cleaning properties: Self-cleaning effectiveness of prepared epoxy coatings was evaluated by self-made soil contaminating and washing method. Soil contamination was achieved in self-made dust storm box (30.5 cm in diameter and 40.6 cm high). It was a plastic bucket containing a beaker with specified amount of soil equipped with high pressure air gun through inlet. Coating sample slide was placed inside the box tilted at 45°. Then soil was blown with help of high pressurized air and allowed to settle for 1 minute. After that, sample was taken out and subjected to washing with sliding water droplet with the help of syringe. The soil for dusting was collected from three different areas.

The ability to self-clean a surface is evaluated by its ease to roll the liquid. The rolling liquid could able to adhere dirt along it during rolling and cleaning the rest of the surface behind. Lower inclination angle corresponds to easier in sliding of liquid and good ability to self-clean that surface by

TABLE 5

Sliding angles for water oil and hexadecane

| Wt % | Water Sliding Angle | | | | Oil Sliding Angle | | | | Hexadecane Sliding Angle | | | |
|---|---|---|---|---|---|---|---|---|---|---|---|---|
| | Additives - methacryloxypropyl based PDMS | | | | | | | | | | | |
| | 2X-10k | 4X-10k | 2X-5k | 4X-5k | 2X-10k | 4X-10k | 2X-5k | 4X-5k | 2X-10k | 4X-10k | 2X-5k | 4X-5k |
| 1 | 26 | 25 | 19 | 21 | 8 | 9 | 7 | 5 | 2 | 2 | 2 | 1.5 |
| 2 | 22 | 20 | 18 | 11 | 7 | 8 | 7 | 5 | 2 | 2 | 1.5 | 1.5 |
| 4 | 26 | 31 | 14 | 11 | 7 | 6 | 7 | 6 | 2 | 2 | 2 | 1.5 |
| 8 | 26 | 31 | 16 | 12 | 7 | 7 | 6 | 6 | 3 | 2 | 1.5 | 1.5 |
| | Additives - monoMethacryloxypropyl based PDMS | | | | | | | | | | | |
| | 2Y-10k | 4Y-10k | 2Y-5k | 4Y-5k | 2Y-10k | 4Y-10k | 2Y-5k | 4Y-5k | 2Y-10k | 4Y-10k | 2Y-5k | 4Y-5k |
| 1 | 58 | 20 | 45 | 40 | 9 | 4 | 10 | 4 | — | — | — | — |
| 2 | 50 | 17 | 36 | 15 | 7 | 3 | 10 | 4 | — | — | — | — |
| 4 | 44 | 18 | 33 | 15 | 7 | 4 | 9 | 3 | — | — | — | — |
| 8 | 34 | 20 | 43 | 18 | 9 | 3 | 9 | 3 | — | — | — | — |

Optical transmittance: Transmittance of coated samples was recorded in the range of 190-800 nm using Perkin Elmer Lambda 25 UV-Vis spectrometer. An uncoated glass slide was used as reference cell. The % T values reported correspond to the wavelength of 540 nm.

liquid. Thus, the self-cleaning ability was evaluated by contaminating the surface of optimized composition and its subsequent cleaning by water. The coating with 2% weight loading of siloxanes from 4Y-5k series was found to be the coating composition with least sliding angle and hysteresis for water and studied for its self-cleaning ability. The neat epoxy resin (i.e., no compatibilizer additive) had quite bad repellencies against water, oil and hexadecane liquids; water droplets remained stuck on a contaminated surface. In contrast, the additive-containing coating showed nice rolling of water droplet taking dirt along it and cleaning the surface behind.

As neat epoxy coatings showed poor repellency against various polar and non-polar liquids, they consequently also showed poor anti-ink properties. In contrast, epoxy coatings incorporating the prepared siloxane-based additives showed excellent anti-ink properties, for example, by shrinking the ink mark of a permanent marker, which ink mark was easily removed by simple wiping with a paper towel.

Example 4—Synthesis of PDMS-Based Vinyl Omniphobic Compatibilizers for Urethane Coatings Omniphobic compatibilizers according to the disclosure were synthesized and then incorporated into a thermoset omniphobic urethane compositions as described below.

Compatibilizer: A polymerization reaction product between a vinyl monomer, a vinyl crosslinking monomer, and a di-vinyl functionalized omniphobic polymer was formed as follows. The di-vinyl functionalized omniphobic polymer was a di-methacrylate functionalized PDMS (5000 and 10000 g/mol) used as a siloxane precursor, the vinyl monomer was tetrahydrofurfuryl acrylate (THF monomer), and the vinyl crosslinking monomer was 2-hydroxy ethyl acrylate (i.e., a hydroxy-functional vinyl monomer). The siloxane precursor (divinyl), tetrahydrofurfuryl acrylate, 2-hydroxyethyl acrylate (HEA), and AIBN initiator (2-3 wt. % relative to monomer) were taken together in reaction flask with THF solvent (monomer:solvent ratio=20:80). This mixture was purged with nitrogen gas and was kept on magnetic stirring hot plate at 65° C. for several hours. The reaction was monitored by taking samples for NMR from reaction flask until all monomers were polymerized. The siloxane content was 25% by weight of the total monomer.

Thermoset Omniphobic Composition: A thermoset omniphobic composition was formed as a reaction product between the above compatibilizer, a polyisocyanate, and a polyol. 0.02 ml of HDIT (hexamethylene diisocayante trimer), 100 mg of omniphobic compatibilizer and 1 ml of dimethylcarbonate solvent were mixed in a glass vial and stirred for 3 hours. After that, 2 ml of polyol (CC939 clearcoat; available from Sherwin-Williams) were added into this mixture with a tin-based catalyst and kept stirring for more 1 hours. 0.48 ml of HDIT were mixed and mixture was casted on glass slide and kept for ambient temperature curing. The samples were tested for water (50 μL) repellency, oil repellency, hexadecane repellency, clarity, and durability. The results are shown in Table 7 below, and the results were rated on a scale of 1 (worst) to 5 (best).

Example 5—Self-Cleaning Vinyl Coatings

This example illustrates the synthesis of a self-cleaning vinyl coating using an omniphobic compatibilizer prepared by free radical polymerization of PDMS-dimethacrylates and vinyl monomers Materials: Tetrahydrofuran (Fisher Chemical), 2,2'-Azobis(2-methylpropionitrile) (Sigma Aldrich) monomethacryloxypropyl terminated polydimethylsiloxane asymmetric (Mn=5000 & 10000 g/mol, Gelest. INC), methacryloxypropyl terminated polydimethylsiloxane (Mn=5000 & 10000 g/mol, Gelest. INC) were purchased and used without further purification. Tetrahydrofurfuryl acrylate (THFA), hexanedioldiacrylate (HDDA), dimethylhydroxyacetophenone (DMHA) were supplied by a manufacturer and were characterized with $^1$H NMR before use.

Compatibilizer: Polydimethylsiloxane based macromers, tetrahydrofurfuryl acrylate, tetrahydrofuran solvent (four times of the total monomers volume), 2,2'-Azobis(2-methylpropionitrile) (AIBN) (2-3 wt %) were charged in a high reaction glass reaction flask under nitrogen atmosphere in gloves box. Tetrahydrofuran solvent was already purged with nitrogen gas in order to free it from entrapped oxygen. The reaction flask was kept under stirring overnight on hot plate at 70° C. Reaction conversion was assured by characterizing sample from reaction mixture by proton nuclear magnetic resonance ($^1$H-NMR) spectroscopy. After completion of the reaction, the product was concentrated by removing THF solvent by rotary evaporator. Table 8 presents the sample code designation of omniphobic compatibilizers (or "additives") and description of their corresponding composition. In Table 8, "A" and "B" denote divinyl- and mon-ovinyl-based PDMS macromers respectively. "4" and "5" denote 40 and 50 wt % of siloxane loading in the additive, respectively. "10k" and "5k" denote molecular weight of PDMS of 10,000 g/mol and 5,000 g/mol, respectively. For example, "4A-10k" means 40% of divinyl PDMS (10,000/gmol), "4B-5k" means 40% of monovinyl PDMS (5,000 g/mol), etc.

TABLE 8

Sample Code Designation and Description for Example 5

| | | Monomers (wt %) | |
|---|---|---|---|
| Serial No. | Sample Code | PDMS Monomer | THFA |
| Additive - methacryloxypropyl PDMS 10K (DIVINYL) | | | |
| 1 | 4A-10k | 40 | 60 |
| 2 | 5A-10k | 50 | 50 |
| Additive - methacryloxypropyl PDMS 5K (DIVINYL) | | | |
| 3 | 4A-5k | 40 | 60 |
| 4 | 5A-5k | 50 | 50 |

TABLE 7

Omniphobic Properties for Coatings of Example 5

| | Compatibilizer Composition | | | | | | | | |
|---|---|---|---|---|---|---|---|---|---|
| Sample | PDMS divinyl (wt %) | THF monomer (mol %) | HEA (mol %) | Water (50 μL) Repellency | Oil Repellency | Hexadecane Repellency | Anti-Ink | Clarity | Durability |
| 1 | 25% | 60% | 15% | 4-5 | 5 | 3-4 | 3-4 | 5 | 5 |

TABLE 8-continued

Sample Code Designation and Description for Example 5

| Serial No. | Sample Code | PDMS Monomer | THFA |
|---|---|---|---|
| Additive - monoMethacryloxypropyl PDMS 10K (MonoVINYL) | | | |
| 5 | 4B-10k | 40 | 60 |
| 6 | 5B-10k | 50 | 50 |
| Additive - monoMethacryloxypropyl PDMS 5K (MonoVINYL) | | | |
| 7 | 4B-5k | 40 | 60 |
| 8 | 5B-5k | 50 | 50 |

Thermoset Omniphobic Composition: The UV cured coatings were prepared by coating a composition of tetrahydrofurfuryl acrylate (THFA) as UV curable monomer, hexanedioldiacrylate (HDDA) as crosslinker, and dimethylhydroxyacetophenone (DMHA) as photo-initiator (2 wt %). The amount of THFA and HDDA was taken in 3:1 ratio. Prepared additives were incorporated in UV curable coatings with varying amount of siloxane contents, i.e., 1, 2, 4 and 8% by weight of coating ingredients. The coating mixture was homogenously mixed under vortex and casted on glass slides by metal applicator of 75-micron depth. The casted coatings were UV cured by passing them in a LC6B BENCHTOP CONVEYOR (available from Heraeus) UV curing machine at conveyor belt speed of 5 m/min and characterized.

Spectroscopic Analysis: The monomers and prepared siloxane additives were analyzed by Fourier-transform infrared (FTIR) and Nuclear magnetic resonance (NMR) spectroscopic techniques as described above for Example 3.

Water contact angle and hysteresis: Water contact angles (WCAs) were measured as described above for Example 3.

The contact angles and hysteresis of water, oil and hexadecane were measured and results are presented in Table 9 and Table 10. The neat UV cured coating showed water contact angle of 43° which reveals its highly hydrophilic surface. Water adhered on its surface very strongly and did not slide on tilting. However, incorporation of prepared additives in coatings showed a remarkable enhancement in repellent properties against these liquids. Water contact angles were improved up to 103° for additives as compared to neat coating (i.e., 43°). In comparison, additives with 40% siloxane contents in their polymer backbone depicted slightly better water contact angles as from those additives with 50% siloxane. This could be due to having sufficient amount of THFA compatibilizer in the polymer backbone of the additives (40% siloxane) to improve miscibility with THFA matrix leading to its well homogenized distribution in it. Lesser amount of THFA compatibilizer reduces the miscibility of siloxane additivities in highly hydrophilic matrix which leads to its phase separation from matrix. This effect was observed during variation of weight % of THFA compatibilizer for preparing additives. The weight % of siloxane contents in additives above than 50% (i.e., 60 and 70%) lessened the amount of THFA compatibilizer and these imparted very poor transparencies of resulted coatings owing to their phase separation from coatings during UV curing. Phase separation of additives leads to its uneven homogeneity in matrix and sometimes it comes at surface. Comparing a 10k system with a 5k system, the 10k series had comparatively better water contact angles.

TABLE 9

Contact angles for water and oil and hexadecane

| Wt % | Water Contact Angle | | | | Oil Contact Angle | | | | Hexadecane Contact Angle | | | |
|---|---|---|---|---|---|---|---|---|---|---|---|---|
| Additives - methacryloxypropyl based PDMS(divinyl) | | | | | | | | | | | | |
| | 4A-10k | 4A-5k | 5A-10k | 5A-5k | 4A-10k | 4A-5k | 5A-10k | 5A-5k | 4A-10k | 4A-5k | 5A-10k | 5A-5k |
| 1 | 103.27 | 93.4 | 100.4 | 102.8 | 60.8 | 57.3 | 55.5 | 57.4 | 19.1 | Spread | 20.4 | 18.8 |
| 2 | 102.8 | 97.5 | 101.6 | 96.6 | 57.6 | 58.5 | 57.7 | 57.9 | 20.1 | 18 | 22.1 | 22.6 |
| 4 | 102.2 | 94.8 | 99.8 | 97.1 | 58 | 56 | 59 | 57.1 | 23.6 | 23.8 | 22 | 23 |
| 8 | 101.5 | 96.6 | 100.9 | 95.7 | 59.2 | 57.3 | 61.5 | 57.7 | 22.1 | 23.1 | 22.1 | 24.3 |
| Additives - monoMethacryloxypropyl based PDMS(monovinyl) | | | | | | | | | | | | |
| | 4B-10k | 4B-5k | 5B-10k | 5B-5k | 4B-10k | 4B-5k | 5B-10k | 5B-5k | 4B-10k | 4B-5k | 5B-10k | 5B-5k |
| 1 | 100.2 | 101.4 | 98.2 | 99.6 | 45.5 | 52.3 | 55.9 | 46.8 | 6.3 | 7.4 | 8.2 | 8 |
| 2 | 94.1 | 98.5 | 101.8 | 99.6 | 47.7 | 42.6 | 47.8 | 42.1 | 9.6 | 10 | 8.2 | 9 |
| 4 | 97.6 | 98.3 | 101.4 | 97.8 | 47.1 | 44.6 | 51.1 | 46.1 | 10.9 | 11.1 | 9 | 10.4 |
| 8 | 100.8 | 99.5 | 96 | 103.3 | 54.4 | 51.4 | 51.3 | 46.2 | 10.1 | 10.3 | 11.6 | 9.9 |

TABLE 10

Contact angle hysteresis for water oil and hexadecane

| Wt % | Water CA Hysteresis | | | | Oil CA Hysteresis | | | | Hexadecane CA Hysteresis | | | |
|---|---|---|---|---|---|---|---|---|---|---|---|---|
| Additives - methacryloxypropyl based PDMS(divinyl) | | | | | | | | | | | | |
| | 4A-10k | 4A-5k | 5A-10k | 5A-5k | 4A-10k | 4A-5k | 5A-10k | 5A-5k | 4A-10k | 4A-5k | 5A-10k | 5A-5k |
| 1 | 0.41315 | 0.92833 | 0.66927 | 0.64780 | 0.30235 | 0.36131 | 0.25108 | 0.28965 | 0.02835 | — | 0.03573 | 0.03773 |
| 2 | 0.49754 | 0.52385 | 0.56975 | 0.33726 | 0.16667 | 0.22684 | 0.21947 | 0.15031 | 0.02609 | 0.05249 | 0.01842 | 0.03509 |
| 4 | 0.23154 | 0.52225 | 0.43456 | 0.48637 | 0.03509 | 0.07571 | 0.18787 | 0.14459 | 0.02820 | 0.03021 | 0.02710 | 0.03098 |
| 8 | 0.27488 | 0.58239 | 0.33843 | 0.45078 | 0.04654 | 0.03631 | 0.11441 | 0.04211 | 0.05251 | 0.01232 | 0.02295 | 0.03321 |

TABLE 10-continued

Contact angle hysteresis for water oil and hexadecane

| Wt % | Water CA Hysteresis | | | | Oil CA Hysteresis | | | | Hexadecane CA Hysteresis | | | |
|---|---|---|---|---|---|---|---|---|---|---|---|---|
| | Additives - methacryloxypropyl based PDMS(divinyl) | | | | | | | | | | | |
| | 4A-10k | 4A-5k | 5A-10k | 5A-5k | 4A-10k | 4A-5k | 5A-10k | 5A-5k | 4A-10k | 4A-5k | 5A-10k | 5A-5k |
| | Additives - monoMethacryloxypropyl based PDMS(monovinyl) | | | | | | | | | | | |
| | 4B-10k | 4B-5k | 5B-10k | 5B-5k | 4B-10k | 4B-5k | 5B-10k | 5B-5k | 4B-10k | 4B-5k | 5B-10k | 5B-5k |
| 1 | 0.48301 | 0.56317 | 0.40749 | 0.50916 | 0.17426 | 0.23027 | 0.22747 | 0.22527 | — | — | — | — |
| 2 | 0.45609 | 0.41816 | 0.43742 | 0.31620 | 0.13483 | 0.08975 | 0.21660 | 0.10115 | — | — | — | — |
| 4 | 0.70965 | 0.43884 | | 0.13943 | 0.09465 | 0.04046 | 0.14516 | 0.03568 | — | — | — | — |
| 8 | 0.39233 | 0.91223 | 0.53761 | 0.44105 | 0.12235 | 0.04801 | 0.07360 | 0.06157 | — | — | — | — |

Similar trends were observed for vegetable oil and hexadecane contact angles. The 4A-10k series exhibited greater oil and hexadecane contact angles comparatively among all others coating series. Mono-methacryloxypropyl based PDMS additives system was used as a control to compare performance with a dimethacrylate based PDMS additives system. As for WCA, the control showed similar water contact angles. However, a significant difference could be seen for oil and hexadecane contact angles. Dimethacryloxypropyl based PDMS additives exhibited considerably higher contact angles comparatively with the control, which showed bad hexadecane repellency as their contact angles reduced by half and they found to have hexadecane spread on their surfaces.

for each particular series up to 8% siloxane loading in coating formulation. However, this decrease in sliding angles could be achieved up to 4% siloxane loading for mono-methacryloxypropyl based PDMS additives (control) for water sliding. These results agree well the contact angle hysteresis as lower hysteresis showed corresponding lower sliding angles. Oil and hexadecane sliding angles were significantly decreased for mono-methacryloxypropyl based PDMS additives, while the control showed bad repellency against hexadecane. The 4A-10k series showed lower sliding angles among all series while its 4% weight loading in the composition showed comparatively lowest sliding angles.

TABLE 11

Sliding angles for water oil and hexadecane

| Wt % | Water Sliding Angle | | | | Oil Sliding Angle | | | | Hexadecane Sliding Angle | | | |
|---|---|---|---|---|---|---|---|---|---|---|---|---|
| | Additives - methacryloxypropyl based PDMS (divinyl) | | | | | | | | | | | |
| | 4A-10k | 4A-5k | 5A-10k | 5A-5k | 4A-10k | 4A-5k | 5A-10k | 5A-5k | 4A-10k | 4A-5k | 5A-10k | 5A-5k |
| 1 | 20 | 39 | 26 | 33 | 33 | 33 | 29 | 29 | 6 | — | 8 | 6 |
| 2 | 22 | 33 | 26 | 22 | 14 | 24 | 13 | 13 | 6 | 11 | 6 | 9 |
| 4 | 20 | 20 | 25 | 20 | 3 | 6 | 10 | 10 | 3 | 5 | 5 | 5 |
| 8 | 20 | 16 | 27 | 20 | 3 | 4 | 3 | 3 | 3 | 3 | 4 | 5 |
| | Additives - monoMethacryloxypropyl based PDMS(monovinyl) | | | | | | | | | | | |
| | 4B-10k | 4B-5k | 5B-10k | 5B-5k | 4B-10k | 4B-5k | 5B-10k | 5B-5k | 4B-10k | 4B-5k | 5B-10k | 5B-5k |
| 1 | 36 | 33 | 26 | 26 | 19 | 19 | 19 | 18 | — | — | — | — |
| 2 | 30 | 30 | 28 | 20 | 11 | 8 | 22 | 10 | — | — | — | — |
| 4 | 32 | 31 | 23 | 18 | 4 | 3 | 14 | 3 | — | — | — | — |
| 8 | 36 | 36 | 29 | 26 | 8 | 4 | 8 | 4 | — | — | — | — |

Contact angle hysteresis is an important parameter that reflects the contact behavior of surface for liquids. It is the difference of receding and advancing angles of a liquid. The lower the value of contact angle hysteresis, the better is the repellency behavior of surface for that particular type of liquid. The results of contact angle hysteresis for water, oil and hexadecane are in accordance with the results observed for contact angles. The coating exhibited 4% of siloxane contents from 4A-10k series showed highest contact angles and lowest hysteresis for water, oil and hexadecane.

Sliding contact angle: The sliding angles of water droplets were measured as described above for Example 3.

Sliding angles were measured with the more accurate sliding angle measurement apparatus and are shown in Table 11 for water, oil and hexadecane liquids. The sliding angles decreased with an increase in siloxane contents in coatings Optical transmittance: Transmittance of coated samples was measured as described above for Example 3.

Figure 7:
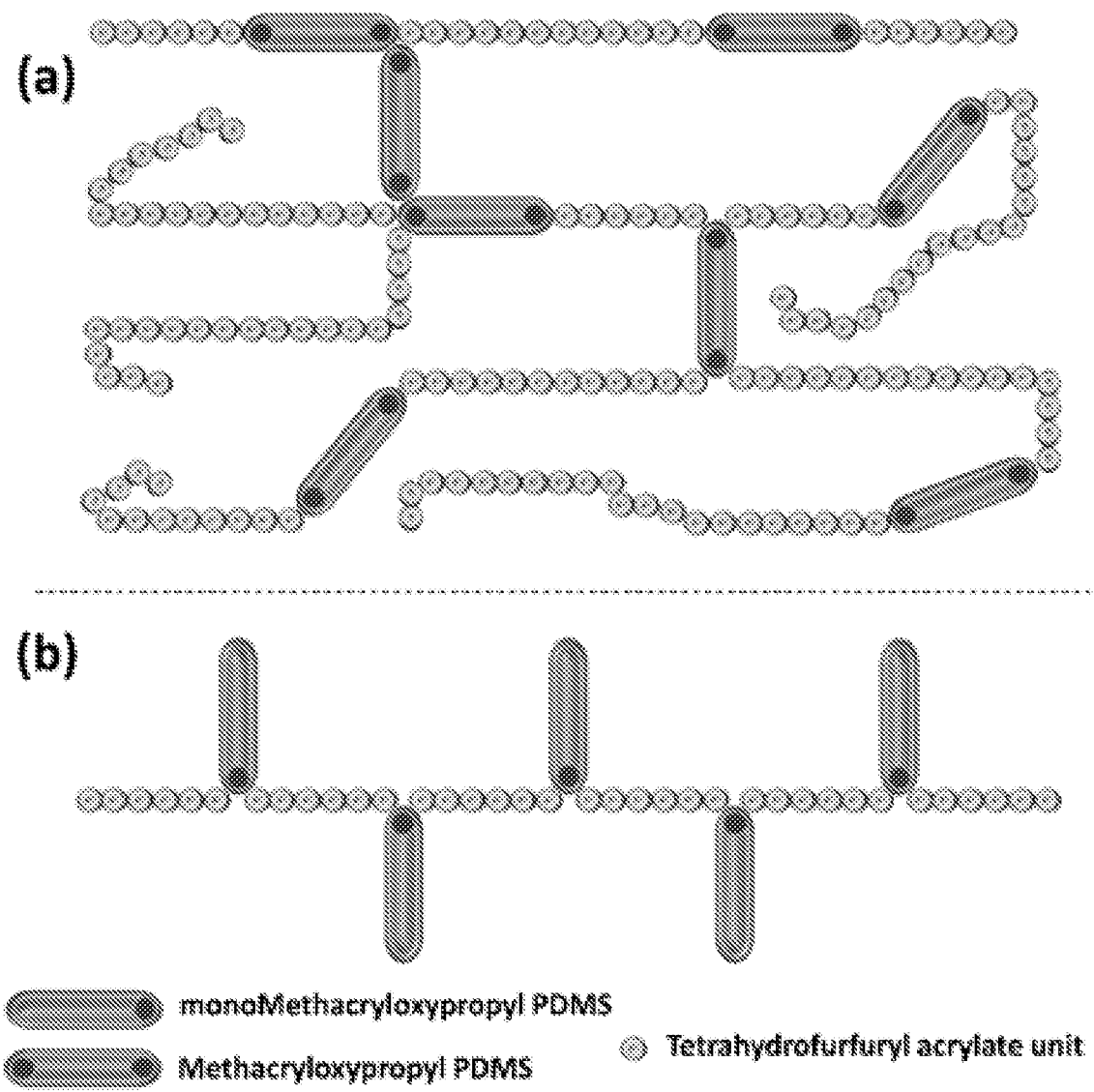
FIG. 7 is a schematic Illustration of polymeric structure of prepared additives based on (a) methacryloxypropyl PDMS (difunctional) interconnecting polymeric chains via its quit long chain length, or (b) mono-methacryloxypropyl PDMS forming linear polymeric chains with a quite long siloxane pendent group.

The percentage transmittances of all coatings are shown in Table 12. These values correspond for coating depth of 75-micron applied by metal applicator. It can be seen that all coatings from methacryloxypropyl based PDMS additives, divinyl showed high optical transparency (near to 100%). The % transmittance reduced very little even at 8% wt loading of siloxane. Although good optical transparency was observed for 4B-10k in Series B, but others coatings showed comparatively bad transparencies, in particular 5B-10k. These reduced transparencies are more likely due phase separation of these additives from matrix coating owing to less amount of compatibilizer, some unreacted PDMS (in monovinyl system), and larger siloxane pendent groups in the backbone chain of the additives. The difference in performance for bifunctional and monofunctional PDMS precursors lies between chemical structure of resultant additives from them. A bifunctional PDMS additive crosslinks with rest of the growing THFA compatibilizer polymer chain during polymerization synthesis of additives, and siloxane units also bind linearly within polymer backbone. The fairly large siloxane units (5k and 10k molecular weight) produce minute crosslinks within polymer chains which prevent the additive from gelling, owing to fewer crosslinks per unit volume. This unique polymer networks limits the phase separation of such additives from coating matrix via THFA compatibilizer. In contrast, a monofunctional PDMS precursor provides pendent siloxane chains, but not siloxane crosslinks. FIG. 7 is a schematic Illustration of polymeric structure of prepared additives based on (a) methacryloxypropyl PDMS (difunctional) interconnecting polymeric chains via its quit long chain length, or (b) mono-methacryloxypropyl PDMS forming linear polymeric chains with a quite long siloxane pendent group.

TABLE 12

Optical transmittance

| Wt % | Water Sliding Angle | | |
|---|---|---|---|
| Additives - methacryloxypropyl based PDMS (divinyl) | | | |
| | 4A-10k | 4A-5k | 5A-10k |
| 1 | 100 | 100 | 100 |
| 2 | 100 | 100 | 100 |
| 4 | 99.8 | 100 | 99.9 |
| 8 | 99.7 | 99.6 | 99.8 |
| Additives - monoMethacryloxypropyl based PDMS (monovinyl) | | | |
| | 4B-10k | 4B-5k | 5B-10k |
| 1 | 100 | 99.3 | 100 |
| 2 | 99.96 | 99.2 | 99.8 |
| 4 | 99.5 | 97 | 95.1 |
| 8 | 98.2 | 92.8 | 91.5 |

Self-cleaning properties: Self-cleaning effectiveness of prepared coating was measured as described above for Example 3.

The coating with 4% weight loading of siloxanes from 4A-10k series was found to be the coating composition with the lowest sliding angle and hysteresis for water and studies for its self-cleaning ability. The neat THFA based UV curable coatings had poor repellencies against water, oil and hexadecane liquids. In contrast, the additive-containing coating showed nice sliding of water, oil and hexadecane liquids on tilting and cleaning its surface by itself from these contaminants.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. An omniphobic compatibilizer comprising:
a polymerization reaction product between:
a first vinyl monomer,
a second vinyl crosslinking monomer having a structure according to formula II:

$$CH_2=CR_1R_3 \qquad (II)$$

where:
$R_1$ is selected from hydrogen atoms, halogen atoms, alkyl groups, aryl groups, nitrile groups, ester groups, carboxylic acid groups, ketone groups, ether groups, and heteroatom-substituted derivatives of the foregoing groups, and
$R_3$ comprises (i) a reactive functional group selected from epoxide groups, isocyanate groups, amino groups, hydroxyl groups, carboxylic groups, and combinations thereof, and (ii) a linking group selected from hydrocarbons containing from 1 to 20 carbon atoms and heteroatom-substituted hydrocarbons containing from 1 to 20 carbon atoms, and
a functionalized omniphobic polymer having a glass transition temperature ($T_g$) of 70° C. or less, the functionalized omniphobic polymer comprising two or more vinyl functional groups;
wherein the polymerization reaction product comprises:
block polymerization segments comprising first vinyl monomer backbone units and optionally second vinyl crosslinking monomer units, but no functionalized omniphobic polymer backbone units; and
random polymerization segments comprising first vinyl monomer backbone units, second vinyl crosslinking monomer units, and functionalized omniphobic polymer backbone units.

2. The omniphobic compatibilizer of claim 1, wherein:
the first vinyl monomer has a structure according to formula I:

$$CH_2=CR_1R_2 \qquad (I)$$

where:
$R_1$ and $R_2$ are independently selected from hydrogen atoms, halogen atoms, alkyl groups, aryl groups, nitrile groups, ester groups, carboxylic acid groups, ketone groups, ether groups, and heteroatom-substituted derivatives of the foregoing groups.

3. The omniphobic compatibilizer of claim 1, wherein the functionalized omniphobic polymer is selected from the group consisting of functionalized polysiloxanes, functionalized polyperfluoroethers, functionalized polyisobutenes, functionalized branched polyolefins, functionalized low molecular weight polyolefins, functionalized poly(meth)acrylates, and combinations thereof.

4. The omniphobic compatibilizer of claim 1, wherein the functionalized omniphobic polymer comprises a di-vinyl functionalized omniphobic polymer.

5. The omniphobic compatibilizer of claim 1, wherein the functionalized omniphobic polymer has a glass transition temperature in a range from −150° C. to 70° C.

6. The omniphobic compatibilizer of claim 1, wherein the functionalized omniphobic polymer is a liquid at a temperature in a range from 0° C. to 40° C.

7. The omniphobic compatibilizer of claim 1, wherein the functionalized omniphobic polymer has a molecular weight ranging from 300 to 50,000 g/mol.

8. The omniphobic compatibilizer of claim 1, wherein:
the first vinyl monomer is present in the polymerization reaction product in an amount in a range from 1 to 99 wt. % based on the polymerization reaction product;
the second vinyl crosslinking monomer is present in the polymerization reaction product in an amount in a range from 0.5 to 20 wt. % based on the polymerization reaction product; and
the functionalized omniphobic polymer is present in the polymerization reaction product in an amount in a range from 0.05 to 70 wt. % based on the polymerization reaction product.

9. A thermoset omniphobic composition comprising:
a crosslinked polymerization reaction product of a mixture comprising:
an omniphobic compatibilizer comprising a polymerization reaction product between (i) a first vinyl monomer, (ii) optionally a second vinyl crosslinking monomer, and (iii) a functionalized omniphobic polymer having a glass transition temperature ($T_g$) of 70° C. or less, wherein the functionalized omniphobic polymer comprises (A) two or more vinyl functional groups or (B) at least one free radical initiator functional group,
a third vinyl monomer,
a fourth polyvinyl crosslinking monomer, and
a UV-curing catalyst;
wherein:
the third vinyl monomer is present in the crosslinked polymerization reaction product in an amount in a range from 5 to 98 wt. % based on the crosslinked polymerization reaction product;
the omniphobic compatibilizer is present in the crosslinked polymerization reaction product in an amount in a range from 0.5 to 20 wt. % based on the crosslinked polymerization reaction product; and
the fourth polyvinyl crosslinking monomer is present in the crosslinked polymerization reaction product in an amount in a range from 0.5 to 20 wt. % based on the crosslinked polymerization reaction product.

10. The thermoset omniphobic composition of claim 9, wherein:
the omniphobic compatibilizer comprises the two or more vinyl functional groups, and
the omniphobic compatibilizer is present in the thermoset omniphobic composition as one or both of (i) a physical blend with the crosslinked reaction product between the third vinyl monomer and the fourth polyvinyl crosslinking monomer, and (ii) a crosslinked reaction product between the omniphobic compatibilizer, the third vinyl monomer, and the fourth polyvinyl crosslinking monomer.

11. The thermoset omniphobic composition of claim 9, wherein:
the omniphobic compatibilizer comprises the at least one free radical initiator functional group, and
the omniphobic compatibilizer is present in the thermoset omniphobic composition as a physical blend with the crosslinked reaction product between the third vinyl monomer and the fourth polyvinyl crosslinking monomer.

12. The thermoset omniphobic composition of claim 9, wherein:
the third vinyl monomer has a structure according to formula I:

$$CH_2=CR_1R_2 \qquad (I)$$

where:
$R_1$ and $R_2$ are independently selected from hydrogen atoms, halogen atoms, alkyl groups, aryl groups, nitrile groups, ester groups, carboxylic acid groups, ketone groups, ether groups, and heteroatom-substituted derivatives of the foregoing groups.

13. The thermoset omniphobic composition of claim 9, wherein the fourth polyvinyl crosslinking monomer is an ester reaction product between (i) an acrylic acid compound and (ii) a polyol selected from the group consisting of polyether polyols, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, isosorbide, and combinations thereof.

14. The thermoset omniphobic composition of claim 9, further comprising one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

15. A coated article comprising:
(a) a substrate; and
(b) a thermoset omniphobic composition according to claim 9, coated on a surface of the substrate.

16. The coated article of claim 15, wherein the substrate is selected from the group of metal, plastics, a different thermoset material, glass, wood, fabric (or textile), and ceramics.

17. The coated article of claim 15, wherein the thermoset omniphobic composition has a thickness ranging from 0.01 µm to 500 µm.

18. The coated article of claim 15, wherein the thermoset omniphobic composition coating is scratch-resistant, ink-resistant, and optically clear.

19. A thermoset omniphobic composition comprising:
a crosslinked polymerization reaction product of a mixture comprising:
an omniphobic compatibilizer comprising a polymerization reaction product between (i) a first vinyl monomer, (ii) a second vinyl crosslinking monomer, and (iii) a functionalized omniphobic polymer having a glass transition temperature ($T_g$) of 70° C. or less, wherein the functionalized omniphobic polymer comprises (A) two or more vinyl functional groups or (B) at least one free radical initiator functional group,
a first thermosetting component comprising functional groups reactive with crosslinking groups of the second vinyl crosslinking monomer in the omniphobic compatibilizer, and a second thermosetting component comprising functional groups reactive with the first thermosetting component.

20. The thermoset omniphobic composition of claim 19, wherein the first thermosetting component and the second thermosetting component together correspond to a thermoset polyurethane.

21. The thermoset omniphobic composition of claim 19, wherein:
the first thermosetting component comprises a polyisocyanate or a polyol;
the second thermosetting component comprises the other of the polyisocyanate and the polyol; and
the second vinyl crosslinking monomer comprises at least one of an isocyanate group and a hydroxyl group.

22. The thermoset omniphobic composition of claim 21, wherein:
the first thermosetting component comprises the polyisocyanate;
the second thermosetting component comprises the polyol; and
the second vinyl crosslinking monomer comprises the hydroxyl group.

23. The thermoset omniphobic composition of claim 21, wherein the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

24. The thermoset omniphobic composition of claim 21, wherein the polyol is selected from the group consisting of polyether polyols, hydroxlated (meth)acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols, isosorbide, and combinations thereof.

25. The thermoset omniphobic composition of claim 19, wherein the first thermosetting component and the second thermosetting component together correspond to a thermoset epoxy.

26. The thermoset omniphobic composition of claim 19, wherein:
the first thermosetting component comprises a polyepoxide or an amine;
the second thermosetting component comprises the other of the polyepoxide and the amine; and
the second vinyl crosslinking monomer comprises at least one of an epoxide group and an amino group.

27. The thermoset omniphobic composition of claim 26, wherein:
the first thermosetting component comprises the amine;
the second thermosetting component comprises the polyepoxide; and
the second vinyl crosslinking monomer comprises the epoxide group.

28. The thermoset omniphobic composition of claim 26, wherein the polyepoxide is selected from the group consisting of polyepoxide-substituted aromatic hydrocarbons, aliphatic hydrocarbons, cycloaliphatic hydrocarbons, ethers thereof, esters thereof, imines thereof, and combinations thereof.

29. The thermoset omniphobic composition of claim 26, wherein the amine is selected from the group consisting of polyamine-substituted aromatic hydrocarbons, aliphatic hydrocarbons, cycloaliphatic hydrocarbons, ethers thereof, esters thereof, imines thereof, and combinations thereof.

30. The thermoset omniphobic composition of claim 19, further comprising one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

31. The thermoset omniphobic composition of claim 19, wherein:
the omniphobic compatibilizer is present in the crosslinked polymerization reaction product in an amount in a range from 0.5 to 20 wt. % based on the crosslinked polymerization reaction product;
the first thermosetting component is present in the crosslinked polymerization reaction product in an amount in a range from 5 to 90 wt. % based on the crosslinked polymerization reaction product; and
the second thermosetting component is present in the crosslinked polymerization reaction product in an amount in a range from 5 to 90 wt. % based on the crosslinked polymerization reaction product.

32. A coated article comprising:
(a) a substrate; and
(b) a thermoset omniphobic composition according to claim 19, coated on a surface of the substrate.

33. The coated article of claim 32, wherein the substrate is selected from the group of metal, plastics, a different thermoset material, glass, wood, fabric (or textile), and ceramics.

34. The coated article of claim 32, wherein the thermoset omniphobic composition has a thickness ranging from 0.01 µm to 500 µm.

35. The coated article of claim 32, wherein the thermoset omniphobic composition coating is scratch-resistant, ink-resistant, and optically clear.

* * * * *